(12) United States Patent
Sneh et al.

(10) Patent No.: US 8,451,582 B2
(45) Date of Patent: May 28, 2013

(54) CAPACITORS WITH HIGH ENERGY STORAGE DENSITY AND LOW ESR

(75) Inventors: Anat Sneh, Boulder, CO (US); Ofer Sneh, Broomfield, CO (US)

(73) Assignee: Sundew Technologies, LLC, Broomfield, CO (US)

( * ) Notice: Subject to any disclaimer, the term of this patent is extended or adjusted under 35 U.S.C. 154(b) by 1389 days.

(21) Appl. No.: 11/658,201

(22) PCT Filed: Jul. 20, 2005

(86) PCT No.: PCT/US2005/025768
§ 371 (c)(1),
(2), (4) Date: Jan. 19, 2007

(87) PCT Pub. No.: WO2006/014753
PCT Pub. Date: Feb. 9, 2006

(65) Prior Publication Data
US 2008/0094775 A1 Apr. 24, 2008

Related U.S. Application Data
(60) Provisional application No. 60/590,748, filed on Jul. 23, 2004.

(51) Int. Cl.
*H01G 4/06* (2006.01)
*H01G 4/005* (2006.01)

(52) U.S. Cl.
USPC ........................................ 361/311; 361/303

(58) Field of Classification Search
USPC ................. 361/311, 303, 503, 508; 29/25.42
See application file for complete search history.

(56) References Cited

U.S. PATENT DOCUMENTS

| | | | | |
|---|---|---|---|---|
| 3,260,904 A | * | 7/1966 | Booe | 361/313 |
| 5,262,247 A | * | 11/1993 | Kajiwara et al. | 428/607 |
| 6,839,219 B2 | * | 1/2005 | Mashiko et al. | 361/311 |
| 2001/0024387 A1 | | 9/2001 | Raaijmakers et al. | |
| 2003/0103317 A1 | * | 6/2003 | Liu et al. | 361/301.5 |
| 2003/0168750 A1 | * | 9/2003 | Basceri et al. | 257/915 |
| 2004/0036051 A1 | | 2/2004 | Sneh | |

FOREIGN PATENT DOCUMENTS

| | | |
|---|---|---|
| EP | 0038890 | 11/1981 |
| EP | 1100295 | 5/2001 |
| GB | 2083950 | 3/1982 |
| JP | 08186237 | 7/1996 |
| JP | 10055938 A * | 2/1998 |
| JP | 2004119830 | 4/2004 |

\* cited by examiner

*Primary Examiner* — Eric Thomas
(74) *Attorney, Agent, or Firm* — Patton Boggs LLP

(57) ABSTRACT

Electrostatic capacitors with high capacitance density and high-energy storage are implemented over conventional electrolytic capacitor anode substrates using highly conformal contact layers deposited by atomic layer deposition. Capacitor films that are suitable for energy storage, electrical and electronics circuits, and for integration onto PC boards endure long lifetime and high-temperature operation range.

18 Claims, 17 Drawing Sheets

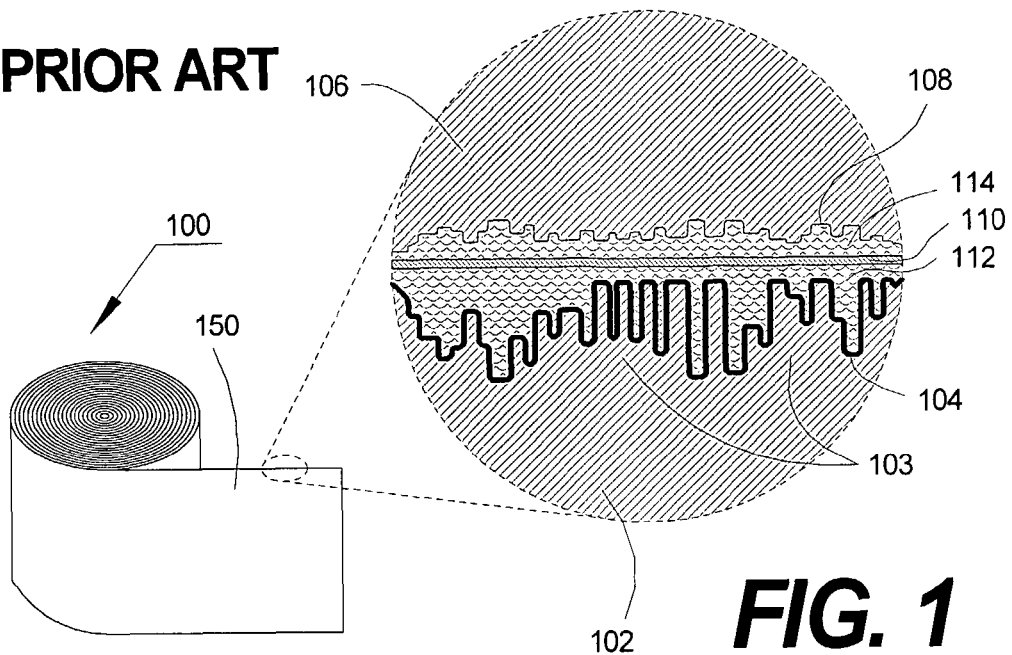
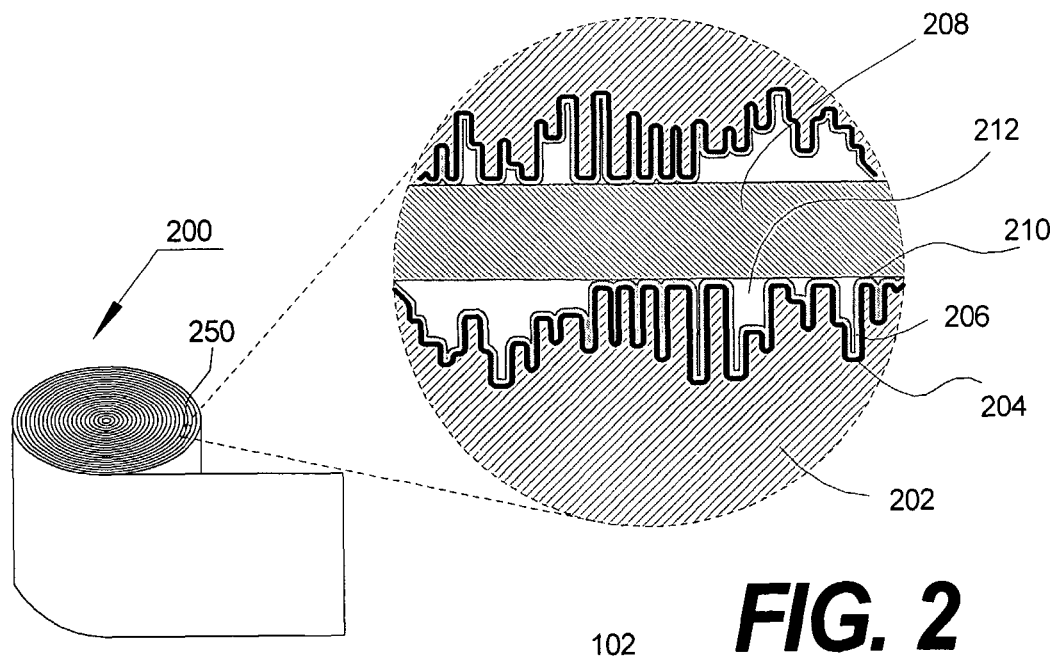

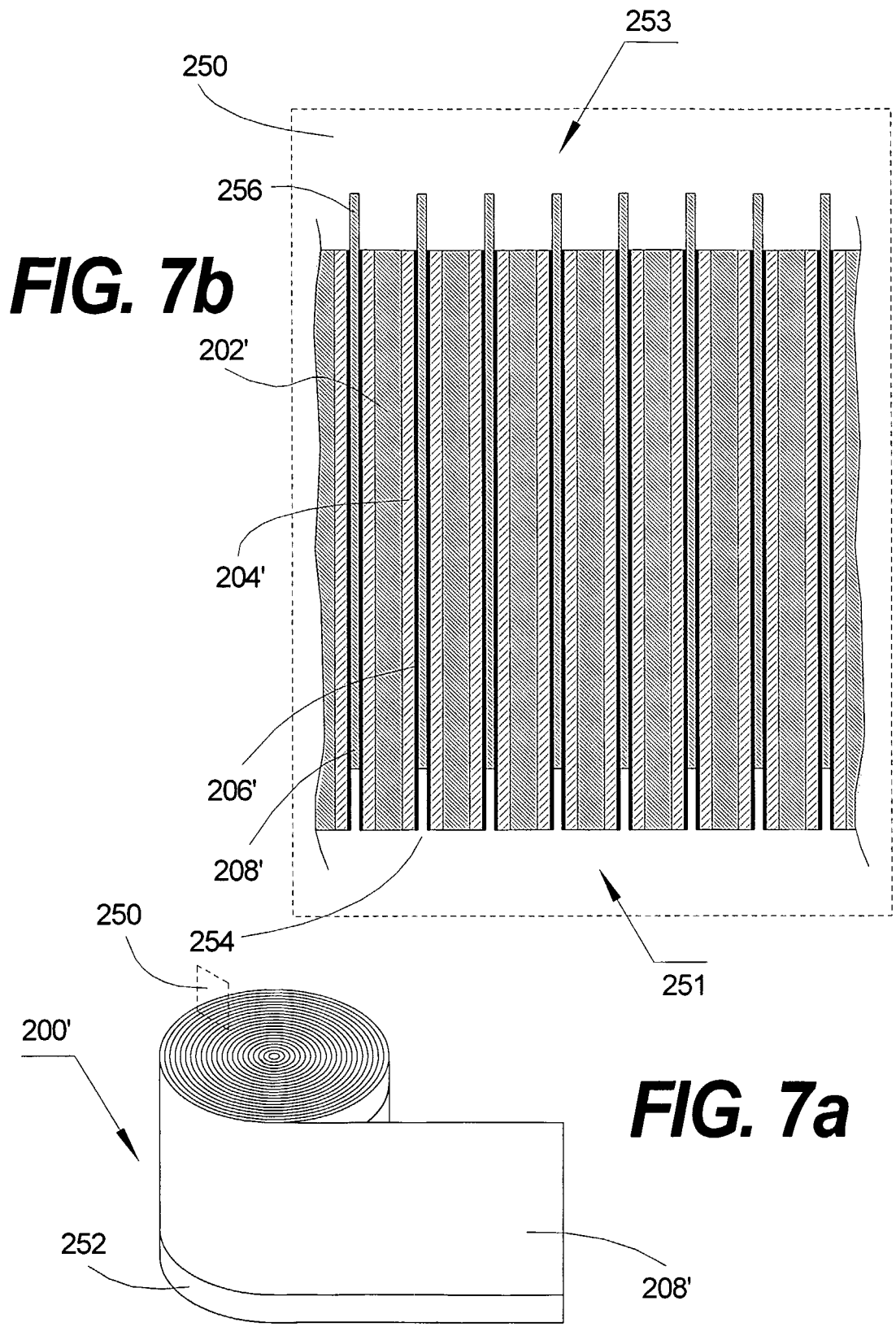

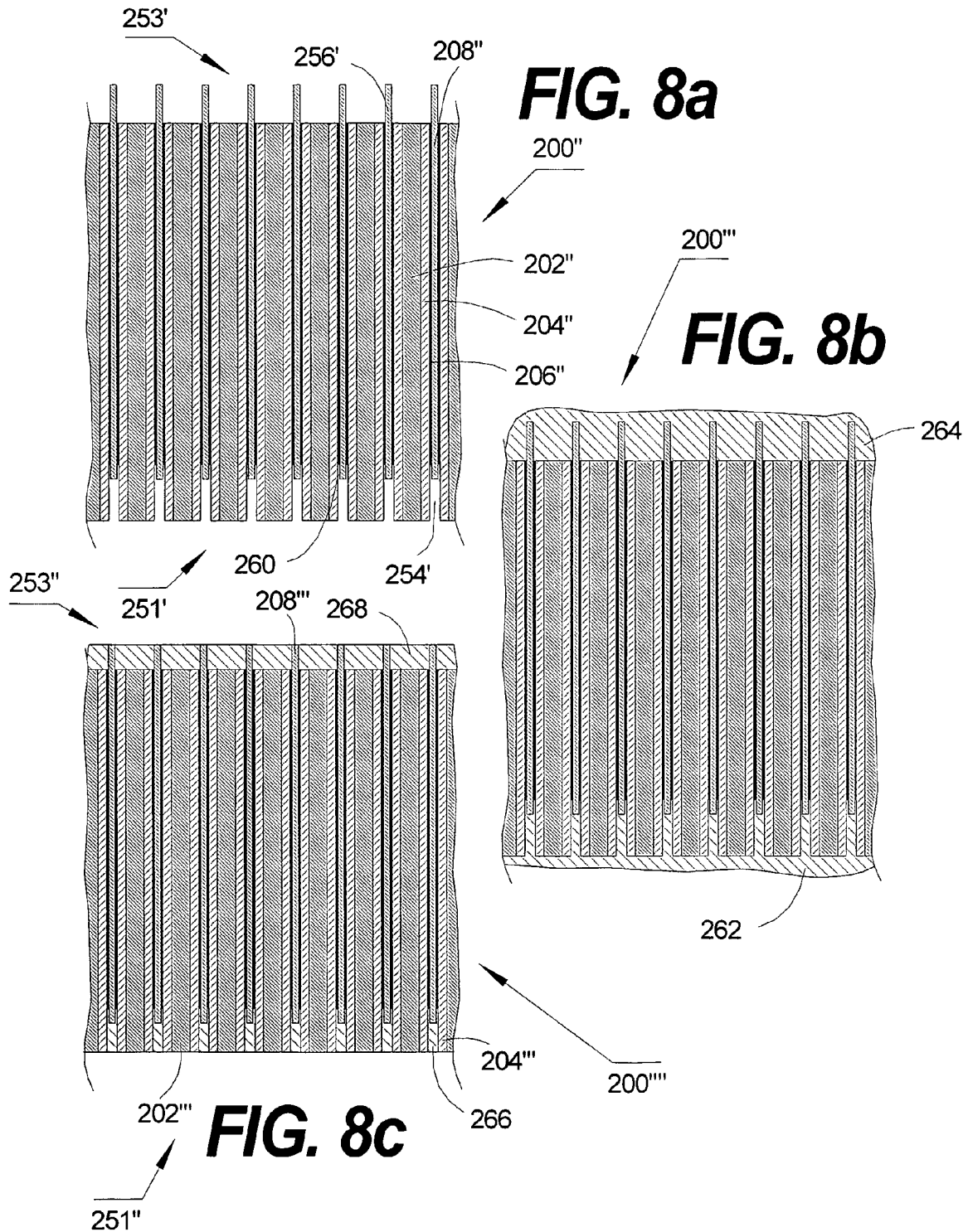

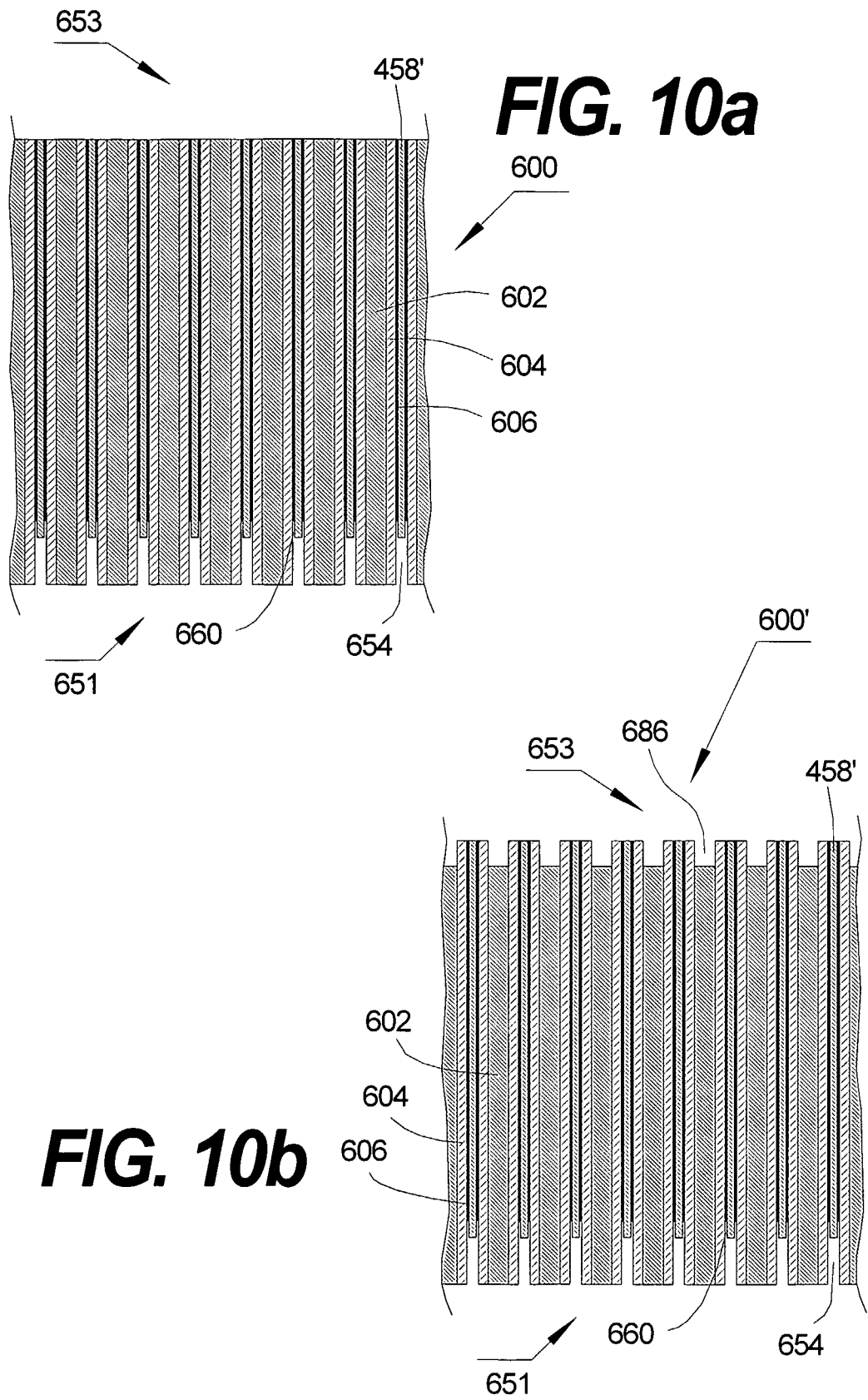

CAPACITORS WITH HIGH ENERGY STORAGE DENSITY AND LOW ESR

BACKGROUND OF THE INVENTION

1. Field of the Invention

This invention relates to the area of electronic components and more specifically to apparatus and method for constructing capacitors with high capacitance and high-energy storage density as well as low equivalent series resistance.

2. Description of Prior Art

Capacitor devices have a host of applications in the electrical, electronics, and microelectronics arts. Many different useful implementations of capacitors were successfully implemented and commercialized. Capacitor properties such as capacitance density, operating voltage, energy storage density, equivalent series resistance (ESR), temperature resilience, and lifetime were constantly improved. Concurrently, substantial drive to reduce the cost and the size of capacitors drove the technology into substantially automatic manufacturing methods and achieved satisfactory commodity status for most applications.

Capacitors are useful for energy storage wherein benefits are fast response, compatibility with high voltage, and extended charge/discharge cycle lifetime (compared to batteries). Most suitable for energy storage and other power applications are electrolytic capacitors that achieve relatively high capacitance density by combining the benefit of a high area anode and corresponding high dielectric constant insulating layer with the contact properties of a liquid or solid electrolyte cathode. The technology of electrolytic capacitors is well known in the art and many useful devices are currently implemented and available in the market. One particular useful design, named Aluminum electrolytic capacitor, applies high area etched aluminum foil with typically between ×25 to ×100 area enhancement factor as an anode and implements the dielectric layer by anodic oxidation growth of $Al_2O_3$ layer. The cathode is implemented with additional aluminum foil and the contact between the cathode and the dielectric is typically facilitated by the usage of an electrolytic solution.

Effective incorporation of aluminum electrolytic capacitors into compact devices typically involves winding strips of anode/dielectric foils and a cathode foil separated with a strip of paper or other films suitable for electrolyte impregnation into a compact tubular shape followed by impregnation with a suitable electrolyte to facilitate the cathode contact.

Aluminum electrolytic capacitors are most commonly used in the industry with advantageous high-capacitance density, relatively high voltage compatibility, and extremely low cost. However, a relatively short lifetime in the order of only several thousands of hours at 85° C., relatively high and constantly deteriorating ESR, high leakage current, polarity, and limited temperature range are only some of the undesired characteristics that have limited the applicability of aluminum electrolytic capacitors, as well as tantalum electrolytic capacitors, as energy storage devices or otherwise circuit components in high performance and highly-reliable electronics. Recent improvements to basic electrolytic capacitor technology successfully incorporate solid polymer electrolytic contact to enhance the lifetime and the useful temperature range with advantageously lower ESR. Clearly, the weak link of aluminum capacitor technology relates to the electrolytic nature of the contact.

Electrolytic capacitors, in general, have been most useful to attain high-capacitance density while they fell short of achieving satisfactory long lifetime, high-voltage compatibility, extended temperature range, and low ESR. In contrast, the technology of thin film capacitors typically implements metalized polymer thin films in an electrostatic capacitor design to achieve significantly suitable high-voltage compatibility, long lifetime, alternating current (AC) compatibility, and improved high-temperature resilience. Thin film capacitors are economically mass-produced by coating both sides of a polymer film with thin metallic films, typically using physical vapor deposition techniques. Compact thin film capacitors are implemented by winding strips of the metalized polymer films into tubular shaped bodies. Alternatively, multilayer stacks of metalized polymer films have been implemented with substantially reduced ESR for the entire capacitor. These film capacitors excel at the high voltage and AC-performance end but have been limited, so far, to relatively low-capacitance density. Additionally, the mainly implemented polymer dielectric films are inherently limited to the temperature range below 120° C. with implications for lower reliability at high-power applications.

The high-capacitance density of electrolytic capacitors is mainly attributed to the starting substrate with its related high-capacitance area. Additionally, a dielectric constant of anodized $Al_2O_3$ within an aluminum electrolytic capacitor or an anodized $Ta_2O_5$ within Ta electrolytic capacitors at $\in_r \sim 8$ and $\in_r \sim 25$, respectively, far exceed the typical dielectric constant of $\in_r \sim 2$ for suitable polymer films. The capacitance follows the formula:

$$C = \frac{\varepsilon_r \varepsilon_0 A}{d} \quad (1)$$

wherein $\in_0$ is the permittivity of vacuum, $\in_r$ is the relative dielectric constant of the dielectric material, A is the effective area of the capacitor, and d is the thickness of the dielectric layer. Practically, the thickness of the dielectric layer is determined by the specifications of the voltage that can be reliably applied over the capacitor without causing catastrophic breakdown or deterioration of electrical properties over the lifetime of the capacitor. For example, $d=V/E_{DB}$ where $E_{DB}$ is the dielectric breakdown field of the dielectric layer. In practice, capacitors are typically derated to ensure extended lifetime, and the dielectric thickness is typically extended by a factor of ×1.5-×2.

A schematic layout of aluminum electrolytic capacitor is depicted in FIG. 1. Accordingly capacitor 100 is fabricated by winding a stack of foils 150 into a compact roll with tubular shape. The foils are slit into long strips prior to the winding process. Foils stack 150 includes anode aluminum foil 102 with etched high-area surface 103 and an $Al_2O_3$ dielectric layer 104 formed by an anodic oxidation process. Cathode aluminum foil 106 includes a thin layer of $Al_2O_3$ 108, which is typically substantially thinner than the thickness of dielectric layer 104. The surface of cathode foil 106 is enhanced by etching typically to a much less extent than the area enhancement 103 of anode foil 102. A paper foil 110 is inserted between the anode and the cathode foils prior to winding the capacitors. Foil 110 is soaked with electrolyte solution following the winding, and a cathode contact is formed by electrolyte solution penetrating into gaps 112 and 114 between foil 110 and anode 102 and foil 110 and cathode 106, respectively. Clearly, capacitor ESR relates with the consistency of the electrolyte solution within gaps 112 and 114. The capacitor essentially consists of an equivalent circuit of two capacitors connected in series with the larger capacitor formed on the anode and the smaller capacitor formed on the cathode.

These capacitors are mainly suitable for direct current (DC) applications where voltage polarity is substantially maintained positive at the anode.

Electrolytic capacitors typically exhibit continuous deterioration of ESR corresponding to the deterioration of the electrolytic cathode contact. Post fabrication yield improvement relies on the electrolytic solution to further anodize dielectric defects to repair locally cracked and thinned dielectric by the growth of anodic oxide at the localized defect. This growth is enhanced at the defect due to a substantially localized higher current.

Capacitors with a capacitance value typically in the range of 0.01-1 µF are employed in significant numbers on a typical PC board (PCB) to create useful electrical and electronic circuits and, therefore, occupy a significant portion of the PCB area. Additionally, costs related to discrete capacitors assembly over the PCB, as well as yield reduction and failure sometimes related to several hundreds of solder joints, are substantial. Finally, performance limitations related to capacitors to PCB contact resistance and inductance are sometimes difficult to overcome. Accordingly, the electronic industry has pursued the integration of capacitors into capacitor arrays and most recently into the layout of the actual PCBs. Full integration of capacitors into the PCB may advantageously reduce the area that is occupied by the capacitor, further reducing the size of electronic devices. Significant cost and weight reductions are additional benefits. Additionally, performance limitations related to contact resistance and inductance are also foreseen as greatly reduced by this integration.

However, the down sides to integrated capacitors are clearly and obviously the high level of PCB customization that is required and the possible PCB yield reduction relating to defective capacitors. While customization is not foreseen as an issue given the inevitable migration of PCBs into full customization, the industry seeks integration techniques that are compatible with current PCB fabrication technology and that are quickly and easily configurable upon the need to constantly update and advance consumer-electronics products, sometimes within only several months. Integrated capacitors yield, therefore, must be as close as possible to 100% and/or some capacitor redundancy is necessary to support low-cost PCB manufacturing and reduce the insurmountable cost of PCB testing.

There is a need for capacitors with improved energy retention density having both high-capacitance density and high-voltage compatibility while maintaining low ESR. These capacitors should preferably have an extended lifetime at an extended temperature range. Additionally, there is a need to improve the performance and extend the lifetime of high-capacity capacitors and increase the specific capacitance per volume and weight. Also necessary are methods that enable capacitor integration into the layout of PC boards without significantly altering current fabrication techniques while maintaining the ability of existing PC board fabrication lines to quickly and effectively customize their product. In particular, low-cost capacitor device layouts and related fabrication methods are desired.

SUMMARY OF THE INVENTION

Atomic layer deposition (ALD) has emerged as a possible deposition method in integrated circuit thin film applications. It has up to now not been considered for macroscopic applications, such as electrolytic capacitors. ALD, up to now, has been considered too slow a process to make the fifty-micron thick films generally associated with such applications. ALD is a cyclic process carried out by dividing a conventional CVD process into an iterated sequence of self-terminating process steps. An ALD cycle contains several (at least two) chemical dose steps in which reactive chemicals are separately delivered into the process chamber. Each dose step is typically followed by an inert gas purge step that eliminates the reactive chemicals from the process space prior to introducing the next precursor. In this manner, ALD lays down films, one atomic layer by another. Thus, to build up a fifty-micron film using this technique has been considered far too laborious and slow for commercial purposes.

However, ALD also provides robust and atomic-level control of film thickness and properties without the need for in-situ monitoring. It deposits continuous and uniform films on any three-dimensional surface structure, penetrating the most narrow and deep grooves, vias, and cavities. Accordingly, ALD films have unique pinhole free and low stress properties which may render them ideal candidates for high yield fabrication of high area devices.

In recent years, there has been a significant drive to insert Atomic Layer Deposition (ALD) films into semiconductor manufacturing. In the next decade, the critical size of an integrated circuit will scale down to only 10 to 25 atomic layers. Consequently, atomic-level control of film thickness and properties is necessary. ALD grows films in a unique layer-by-layer fashion allowing for conformal and uniform growth over challenging substrate topologies with atomic-level control and is currently the only known film deposition technique proven to accomplish such stringent requirements. Therefore, ALD holds an important key to the future of the IC industry, as well as many other technologies.

Within the ALD process, the deposition thickness per cycle is precisely and reproducibly dictated by self-saturation mechanism. The deposition is the outcome of chemical reactions between reactive molecular precursors and the substrate. In similarity to CVD, elements composing the film are delivered as molecular precursors. The net reaction must deposit the pure desired film and eliminate the "extra" atoms that compose the molecular precursors. In the case of CVD, the molecular precursors are fed simultaneously into the CVD reactor. The substrate is kept at a temperature that is optimized to promote chemical reaction between the molecular precursors concurrent with efficient desorption of byproducts (so that the byproducts do not incorporate into the film). Consequently, the reaction proceeds to deposit the desired pure film. Table 1 summarizes the main differences between the ALD and CVD processes.

TABLE 1.1

Comparison between ALD and CVD

|  | CVD, PVD | ALD |
| --- | --- | --- |
| Growth Mode | Continuous | Stepwise - layer by layer |
| Growth Rate | Variable | Growth per step is accurately defined |
| Thickness Control | Rate × Time | Dialed in with a selected number of steps |
| Growth Initiation | Nucleation, grain growth | Continuous film |
| Film Properties | Pinholes, compressive stress | Pinhole-free, negligible stress |
| Conformality | Varies and difficult to maintain | 100% and robust over toughest 3D structures |

ALD offers many advantages over other more conventional techniques and is best suitable for some of the most challenging thin film deposition applications. ALD films can be uniquely grown continuously on substrates avoiding inferior discontinuous transition caused by nucleation. As a result, ALD films grow pinhole free and practically stress free. All other deposition techniques initiate film growth by nucleation. Nucleation is the outcome of only partial bonding between the substrate and the growing film. In the CVD case, for example, molecular precursors attach to the surface mainly by CVD reactions between the reactive precursors on the surface. Nucleation is followed by the growth of grains. When the grains finally coalesce into continuous films, the thickness could be on the order of 5 nm to 10 nm in the case of CVD and even thicker in the case of physical vapor deposition (PVD). Films initiated by nucleation exhibit substantial compressive stress and abundance of pinholes that extend far beyond coalescence depth. Pinholes and compressive stress are associated with non-ideal grain boundaries and typically render CVD and PVD films inadequate for passivation and encapsulation applications at layer thicknesses of less than 500 nm.

ALD films can grow continuously at any thickness, provided that the surface of the substrate is made reactive to one of the ALD precursors. In this case, ALD films can be grown with layer-by-layer continuity all the way from the interface. The ability to initiate the surface and start layer-by-layer growth from the first layer makes ALD films continuous, low stress, and pinhole free; thus, it is an ideal candidate for devices with high-capacitance area substrates wherein the reliability and yield crucially depend on the number or density of defects. For example, ALD dielectric films are developed for DRAM capacitor applications wherein they were proven to maintain close to 100% yield for ultrathin films in the range of ~5 nm over area-enhanced wafers with actual area exceeding 10,000 $cm^2$. Additionally, $Al_2O_3$ dielectric films predominantly overtook PVD films in the magnetic data storage industry wherein magnetic sensors are manufactured at practically 100% yield using ALD. Finally, ALD films utilized for device encapsulation applications have shown significant device reliability improvements indicating pinhole free coatings over large-size flat panel devices, as well as other devices. As a result, very thin encapsulation films can be realized by ALD with minimized adverse impact on device performance. For example, IC devices can be encapsulated at the wafer level with minimized impact on performance or subsequent packaging process flow.

Given the superior low-defectivity and conformality of ALD films, they are exceptionally suitable for the deposition of dielectric and conductive films for high-energy and capacitance applications.

It is the objective of the present invention to provide a method for capacitor manufacturing with improved capacitance and energy density while maintaining low ESR. It is another objective of the invention to improve electrolytic capacitor device layouts and create an electrostatic capacitor device layout by substituting the electrolyte with a highly conformal conductive film, therefore constructing an electrostatic capacitor while mainly implementing electrolytic capacitors manufacturing techniques. It is yet another objective of this invention to improve the temperature resilience and the lifetime of high-capacitance and high-energy density capacitors. It is also the objective of this invention to provide a capacitor device layout and related fabrication methods that are compatible with alternating current (AC). It is also an objective of this invention to provide capacitors that can be integrated into PC boards.

In another scope of the invention, capacitor manufacturing yield is improved by incorporating methods and apparatus for repairing defects within capacitor dielectric layers. In another aspect of the invention, capacitor manufacturing yield is further improved by incorporating "self-healing" of localized, low-dielectric, breakdown spots.

In another aspect of this invention, the equivalent series resistance (ESR) of high-capacitance and high-energy density capacitors is substantially reduced by substantially reducing the contact resistance with both the anode and the cathode.

The invention implements high-capacitance area anode substrates that are commonly used in the fabrication of electrolytic capacitors together with conformal formation of high-quality dielectric films and conductive films to fabricate electrostatic capacitors with substantially improved capacitance density, lifetime, and temperature endurance. Complimentarily, the invention teaches layouts and fabrication methods that achieve high-capacitance density and high-energy density capacitors with extremely low ESR. Additionally, the invention presents a viable scheme for capacitor-PCB integration.

Methods that are useful to repair defects in capacitor dielectric layers include ALD deposition into imperfections, utilization of ALD films for at least a portion of the dielectric layer, and biasing the dielectric layers under oxidizing conditions. Additionally, the entire capacitor foil stack is biased to substantially remove a conductive contact film from weak points by virtue of localized heat generation and evaporation and/or oxidation of the contact layer from the weak points.

In one aspect of the invention, a capacitor comprises a capacitor foil. The capacitor foil includes a metallic foil. The metallic foil is chemically etched to achieve high-capacitance area. The capacitor foil further includes a conformal and substantially uniform dielectric layer grown over the metallic foil and a substantially uniform and conformal conductive film grown on the dielectric layer. In another aspect of the invention, the capacitor preferably includes an additional metal foil that preferably forms a substantial electrical contact with a portion of the conformal conductive film. In another aspect of the invention, at least a portion of the conformal conductive film is preferably grown by ALD. In another preferred aspect of the invention, the capacitor foil preferably comprises an additional conductive layer preferably having substantial electrical contact with the conformal conductive film. Preferably, the capacitor further includes an additional metal foil and the additional metal foil preferably forms a substantial electrical contact with a portion of the additional conductive film. In another preferred aspect of the invention, the capacitor foil is preferably formed into a strip, the additional metal foil is preferably formed into a strip, and the strips preferably have substantially similar width and length; and the strip of capacitor foil and the strip of additional metal foil are preferably wound to form a substantially compact capacitor core shape. In one additional aspect taught by the invention, electrical contacts are preferably formed on the planar faces of the capacitor core. The electrical contacts preferably comprise a first insulation over the edge of the additional metal foil on the first face, a first electrical contact with the edge of the metal foil preferably formed on the first face, a second insulation over the edge of the metal foil on the second face, and a second electrical contact with the edge of the additional metal foil preferably formed on the second face. In another aspect of the invention, the electrical contacts are preferably formed on the planar faces of the capacitor core preferably including a first insulation over the edge of the additional conductive layer on the first face, a first electrical contact with the edge of the metal foil preferably formed on the first face, a second insulation over the edge of the metal foil on the second face, and a second electrical contact with the edge of the additional conductive layer preferably formed on the second face. In another preferred aspect of the invention, the capacitor foil is preferably formed into a strip and preferably wound to form a substantially compact capacitor core shape. In an additional aspect of the invention, the capacitor preferably comprises a capacitor core stack comprising a first metal foil and a repeatable stack. The repeatable stack preferably comprises a selected number of foil pairs, and each foil pair preferably includes the capacitor foil and the additional metal foil. In an additional aspect of the invention, the capacitor preferably comprises a capacitor core stack of the capacitor foil. Further, the capacitor core stack is preferably cut into capacitor core pieces, and electrical contacts are preferably formed on two parallel sides of the capacitor core pieces. These electrical contacts preferably comprise a first insulation over the edge of the additional metal foil on the first side, a first electrical contact with the edge of the metal foil formed on the first side, a second insulation over the edge of the metal foil on the second side, and a second electrical contact with the edge of the additional metal foil formed on the second side. In another preferred variant of the invention, the capacitor core stack is preferably cut into capacitor core pieces, and electrical contacts are preferably formed on two parallel sides of the capacitor core pieces. The electrical contacts preferably comprise a first insulation over the edge of the additional conductive layer on the first side, a first electrical contact with the edge of the metal foil preferably formed on the first side, a second insulation over the edge of the metal foil on the second side, and a second electrical contact with the edge of the additional conductive layer preferably formed on the second side. In a preferred aspect of the invention, at least a portion of the dielectric layer is preferably formed by ALD. In another preferred aspect of the invention, at least a portion of the dielectric layer is preferably formed by anodic oxidation. In an additional preferred modification of the invention, a portion of the dielectric layer is preferably formed by anodic oxidation, a portion of the dielectric layer is preferably formed by ALD, and the thickness of the ALD portion is preferably selected to substantially increase the breakdown voltage of the dielectric layer. In one preferred aspect of the invention, the capacitor foil is preferably electrically biased wherein electrically biased preferably comprises applying electrical potential between the metal foil and the conformal conductive film, and the electrical potential is preferably selected to increase the breakdown voltage of the dielectric layer without substantially reducing the capacitance of the capacitor foil. In an additional aspect of the invention, the capacitor foil is preferably electrically biased wherein electrically biased preferably comprises applying electrical potential between the metal foil and the conformal conductive film, and the electrical potential is preferably selected to reduce the leakage current through the dielectric layer without substantially reducing the capacitance of the capacitor foil. In another preferred aspect of the invention, the dielectric layer is preferably electrically biased wherein electrically biased preferably comprises applying electrical potential between the metal foil and an electrolyte, the electrolyte preferably provides electrical contact with the dielectric layer, and the electrical potential is preferably selected to increase the breakdown voltage of the dielectric layer without substantially increasing the thickness of the dielectric layer. In an additional aspect of the invention, a preferred application of the capacitor foil is mounted onto a PCB and the PCB comprises electrical contact pads. The mounting preferably comprises substantially making low ESR electrical contact with the electrical contact pads, and the capacitor foil is then preferably delineated to define capacitors. The defined capacitors preferably comprise a selected capacitance, and the selected capacitance is preferably determined by the capacitance per area of the capacitor foil and the area of the defined capacitors. Preferably, the integrated capacitors are embedded within the layer structure of the PCB. A preferred material for the metal foil according to one aspect of the invention comprises aluminum. A preferred material for the dielectric layer according to one aspect of the invention comprises aluminum oxide. A preferred material for the conformal conductive film comprises titanium nitride. In a preferred aspect of the invention, the high-capacitance area of the metal foil comprises more than 10× area enhancement. In another preferred aspect of the invention, the capacitor foil preferably comprises the high-capacitance area on both sides, and the dielectric layer is preferably grown on both sides of the metal foil, and the conformal conductive film is preferably grown on the dielectric layer on both sides of the capacitor foil.

The invention also teaches a capacitor fabrication method comprising applying high-capacitance area metal foil, subsequently oxidizing the entire area of the high-capacitance area foil and conformally growing a conductive film onto the dielectric film to facilitate a capacitor foil. Preferably, the method further comprises winding the capacitor foil into a capacitor core, and the capacitor core has two faces, electrically contacting to the edge of the high-capacitance area metal foil on the first face and electrically contacting to the edge of the conductive film on the second face. In a preferred variant of the invention, the capacitor fabrication method further includes stacking the capacitor foil into a capacitor core stack, cutting the capacitor core stack into capacitor core pieces, selecting two parallel sides on the capacitor core pieces, electrically contacting to the edge of the high-capacitance area metal foil on the first side, and electrically contacting to the edge of the conductive film on the second side.

BRIEF DESCRIPTION OF THE DRAWINGS

The accompanying drawings, which are incorporated in and form a part of the specification, illustrate the preferred embodiment of the present invention, and together with the description serve to explain the principles of the invention. In the drawings:

FIG. 1 depicts schematically the prior art layout of aluminum electrolytic capacitors;

FIG. 2 depicts schematically the layout of high-energy storage density capacitors according to the invention;

FIGS. 7a and 7b depict schematically the layout of high-energy storage density capacitors utilizing a displaced cathode foil to reduce ESR following the winding of a cathode foil with an anode-dielectric-contact foil according to the invention;

FIGS. 8a-8d depict schematically the fabrication of low resistance contact with the anode and cathode according to the invention;

FIGS. 10a-10c depict schematically the fabrication of low-resistance contact with the anode and cathode according to the invention;

DETAILED DESCRIPTION OF THE PREFERRED EMBODIMENT

A. Area Enhanced Electrostatic Capacitors

Figure 3A:
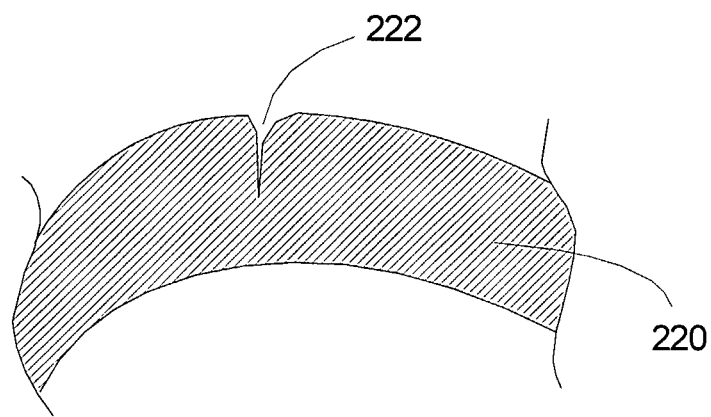
FIGS. 3a and 3b depict schematically the mechanism for defect repair implementing deposition of ALD dielectric films over dielectric films grown by anodic oxidation according to the invention.

A key aspect of the invention is the fabrication of macroscopic electrical devices, such as macroscopic capacitors using conformal layers deposited using atomic layer deposition (ALD). These devices can be used as discrete electrical components, as components of hybrid circuits, as portions of integrated circuit boards, and other applications. In this disclosure, "macroscopic" means the individual electrical element, such as an individual capacitor, is 200 microns in size or larger. Preferably, the individual electrical element is 2,000 microns or larger.

In an exemplary preferred embodiment of the invention, an etched aluminum foil is applied as the starting substrate. Commercially available etched aluminum foils are mass-produced for applications as electrolytic capacitors anodes as known in the art. These foils are available, for example, from 25 µm and 250 µm with specific area enhancement up to ~×100. FIG. 2 illustrates the capacitor 200 composed of etched aluminum foil 202, dielectric layer 204, and contact layer 206 making electrical contact 210 with cathode aluminum foil 208. A variety of etched aluminum foils may be implemented as anode 202 with area enhancement in the range of from ×25 to ×100. The high-capacitance area substrates are characterized by a fine etch structure that is most suitable for implementation of relatively thin dielectric layer 204 in the range of from 10 nm to 200 nm and, therefore, are suitable for low voltage capacitor applications in the range of from 5V to 100V. Lower area enhancement is suitable for thicker dielectric films in the range from 0.2 µm to 2 µm (and even thicker) and accordingly higher voltage capacitor applications in the range of from 100V to 1000V.

The characteristic area enhancement of foil 202 is selected to best fit the properties of the capacitor. For example, foil 202 is implemented by using conventional aluminum foil with 50 µm thickness and ×40 area enhancement that typically exhibits a consistent etch pattern that extends from 10 µm to 25 µm deep into the foil from both sides. The etched structure consists of deep pores ranging in width between 2 µm and 4 µm penetrating substantially vertically from the foil's surface. The density of foil 202 is reduced by the etching down to ~1.5 grams/cm$^3$. Dielectric layer 204 is preferably formed by anodic oxidation as known in the art. Other methods suitable for forming dielectric layer 204 with improved yield are discussed below, including growth of highly conformal film using Atomic Layer Deposition (ALD) or combinations of anodic oxidation and complementary ALD grown films. The contact layer 206 is formed using ALD to create a conformal electrode over dielectric layer 204. As detailed above, ALD is most suitable for the deposition of highly conformal high-quality films over high-capacitance area substrates. For example, a 50 nm TiN film with resistivity of ~300 µΩcm is suitable. Alternatively, a stack of 5 nm TiN and 45 nm W is implemented with resistivity of ~10 µΩcm to improve ESR through better contact resistance.

Capacitor 200 is formed by winding strips 250 cut from foil 202 (now coated with layers 204 and 206) together with an un-etched capacitor grade aluminum foil 208 to form a layered substantially tubular shape. Foil 208 typically has ~5 µm thickness and 2.7 grams/cm$^3$ density. The layered structure is shown in a schematic cross-sectional view in the inset of FIG. 2. The contact between foil 208 and layer 206 typically includes only a portion of the area 210. A portion of the area 212 corresponding to the porous extension into the etched pores does not directly contact foil 208. Nevertheless, the contact resistance into the pores is relatively small as detailed below.

In a specific example of FIG. 2, a strip of 2 cm×500 cm of foil 202 is applied with 1 µm of dielectric $Al_2O_3$ layer 204. The area enhancement includes a ×40 enhanced surface area and the utilization of both sides of the foil to generate ~80,000 cm$^2$ of actual area. This capacitor has C ~566 µF of capacitance and is suitable for 500V applications when 50% derating is used. Alternatively, a 10V capacitor is formed with a ×100 enhanced foil 202 and a 20 nm thick dielectric layer 204. Strips with 2 mm×10 cm area have an actual area of ~400 cm$^2$ given the area enhancement and the applicability of both sides of foil 202. This capacitor has a capacitance value of C ~140 µF which is substantial given the small volume of ~0.025 cm$^3$ (~3 mm diameter when rolled over a 1/16" outer diameter Teflon rod) and the weight of ~0.02 grams. Accordingly, capacitance density of ~7000 µF/gram is achieved.

B. Yield Improvement Methods

Electrolytic aluminum capacitors typically fail when capacitor ESR deteriorates beyond useful range. Dielectric failure is typically prevented by a self-healing mechanism attributed to the electrochemical formation of dielectric layer thickening at weak spots. Weak spots can be described as a localized thin dielectric area that relates to imperfections in the anodic oxidation process. For example, FIG. 3a illustrates schematically localized thin spot 222 formed within dielectric layer 220. Cracks and other defects such as 222 are unavoidable in the anodic oxidation process due to significant (more than ×1.4 at room temperature) expansion of aluminum upon oxidation and the fact that the $Al_2O_3$ grown in the anodic oxidation process is growing at the interface between the substrate aluminum and the layer $Al_2O_3$ and under already formed $Al_2O_3$, therefore significantly stressing the overlaying, already formed $Al_2O_3$. The localized thin spots are susceptible to dielectric breakdown at substantially lower voltage than the fully thick areas of layer 220. Accordingly, when electrolytic capacitors are subjected to the fully specified voltage, the localized thin spots break down and exert relatively high current that is localized at the breakdown spots. The current induces additional anodic oxidation that essentially "repairs" the spots by the growth of thick localized $Al_2O_3$. The repair process ceases when the dielectric breakdown is turned "off"; that is, when the dielectric thickness at that spot reaches an appropriate thickness. This useful mechanism of "aging" is a key advantage of electrolytic capacitor technology, enabling the fabrication of large capacitance capacitors with high yield. However, the "self-correction" mechanism relies on the electrolyte to supply the oxygen for the oxidation process.

Figure 3B:
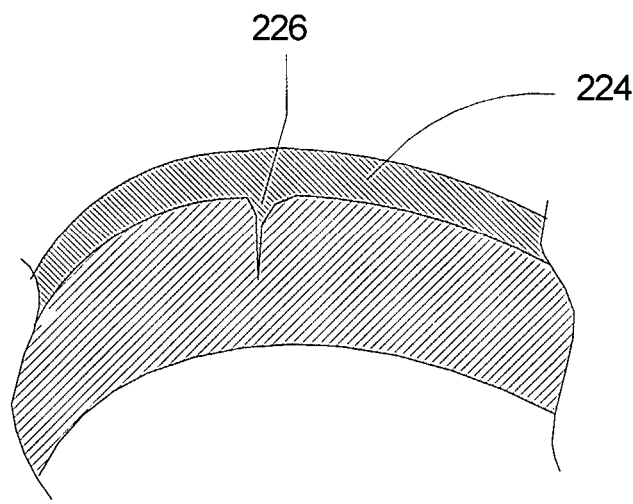

In the electrostatic capacitor layout disclosed in this invention, the electrolytic solution is replaced with solid conductive film 206 (FIG. 2) and the final capacitor does not posses the "self-correction" properties. However, implementation of anodic oxidation techniques to form dielectric layer 204 is still desired in most cases. Accordingly, the embodiment shown in FIG. 3b implements a stack of anodized $Al_2O_3$ layer 220 with an ALD $Al_2O_3$ layer 224 to provide defect repair by virtue of conformally filling ALD film 226 into localized thin spot 222 during the creation of layer 224. When the width of the localized defect is less than half of the thickness of layer 224, the ALD technique is proven to seamlessly fill the feature 222 up to the total thickness of combined layer 220+224 as illustrated in FIG. 3b.

Figure 4A:
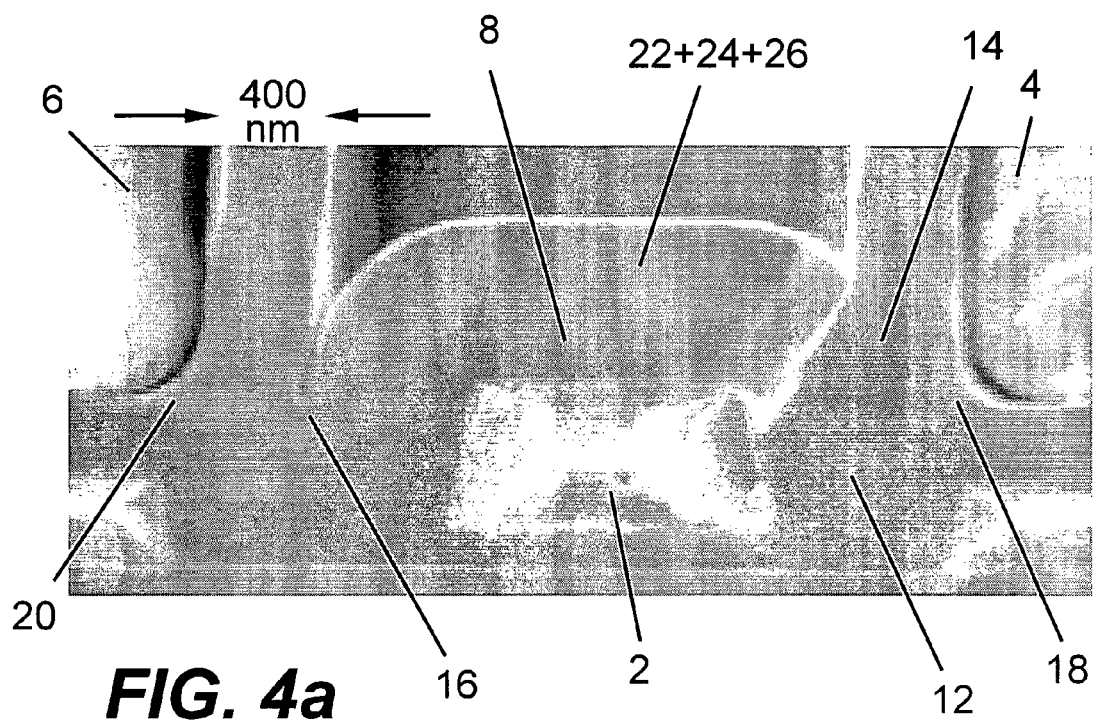
FIGS. 4a and 4b depict a cross-sectional SEM image of a structure seamlessly filled with an ALD film according to the invention.
Figure 4B:
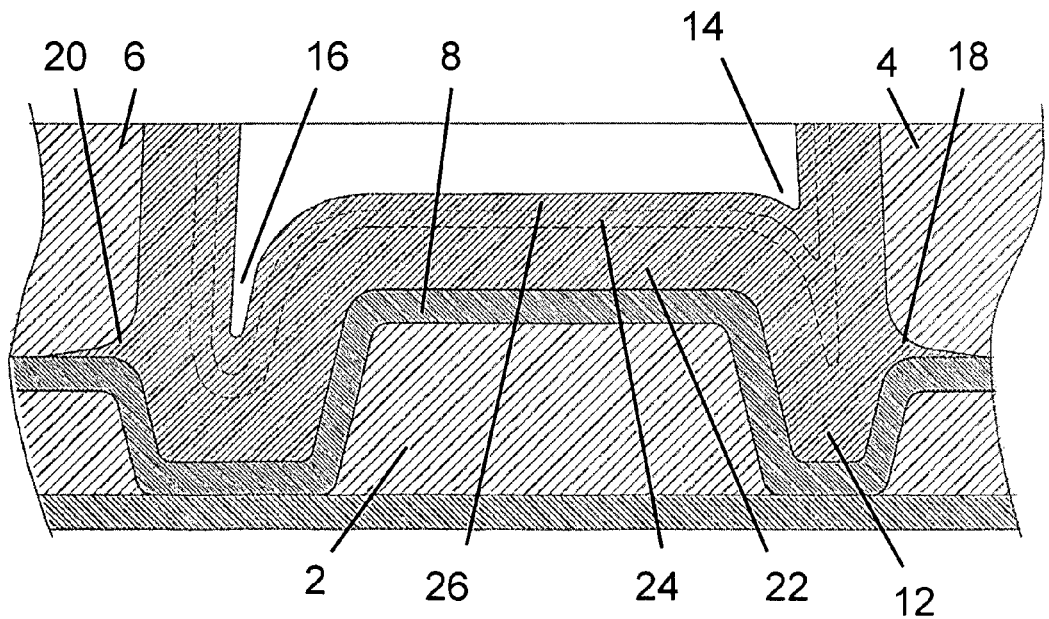

FIG. 4 illustrates a SEM image (FIG. 4a) of a 400 nm thick ALD film 22+24+26 deposited over a complicated device structure. The device layout prior to deposition includes crevices 18 and 20, as well as a trench feature 12 that is substantially narrow than 2×400 nm. FIG. 4b provides an illustration of the layout of FIG. 4a for better clarity. The ALD film is also divided in FIG. 4b into three "layers" to illustrate the consecutive growth and fill-up of feature 12. Note the consistent and seamless filling of features 18 and 20, the undesired crevices that relate to some delamination of metal features 4 and 6, respectively, during the metallization process. Also note that feature 12, although not a defect but rather a designed feature, is completely and seamlessly filled up with the ALD film. Also, the ALD film exhibits precisely 400 nm thickness in all areas that do not correspond to features narrower than 800 nm wherein the completely conformal film did not manage to completely fill up the features. This fact is explicitly obvious at feature 16 that is only slightly wider than 800 nm and, therefore, is perfectly conformally coated but not closed.

As illustrated in FIG. 4, when the thickness of layer 22+24+26 exceeds half of the width of a crevice or a feature, for example area 12, the feature (or defect) is entirely filled and the thickness of the ALD layer above the crevice minus the depth of the crevice equals the thickness of layer 22+24+26 on the entire area. This seamless gap-filling property is attributed to the layer-by-layer growth mechanism of ALD and is further illustrated in FIG. 5.

Figure 5A:
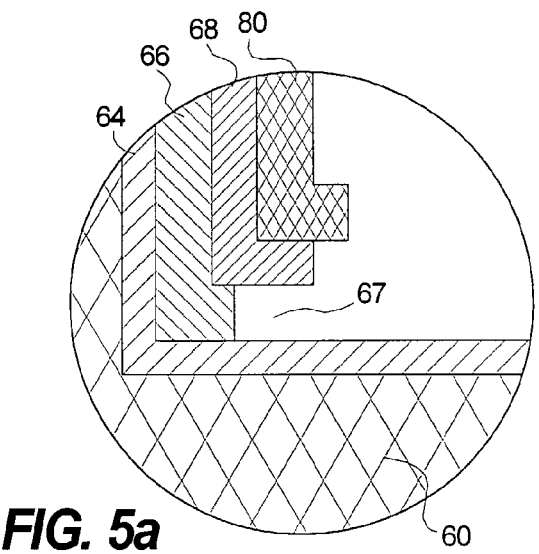
FIGS. 5a-5e depict schematically the mechanism of gap filling with ALD according to the invention.
Figure 5B:
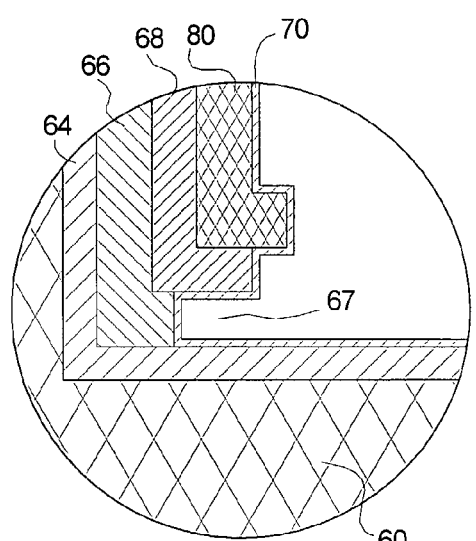
Figure 5C:
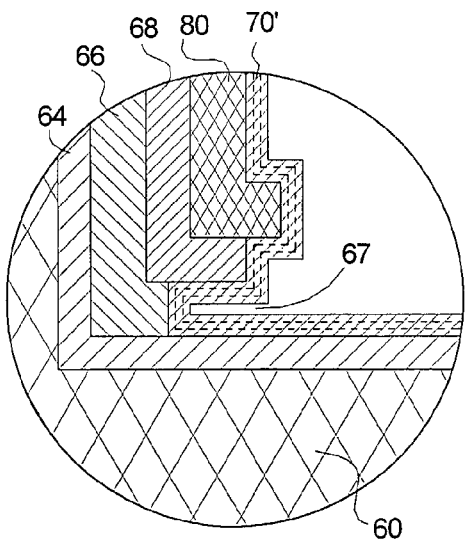

In FIG. 5a, a recess 67 has been formed in layer 66. As shown in FIG. 5b, an initial layer of dielectric film 70 is grown over the entire surface area of the device layout by ALD. The use of ALD enables a layer of dielectric film 70 to completely cover the surface area of the existing structure, including recess 67. The thickness of dielectric film 70 is grown through the successive deposition of additional layers of dielectric film. As shown schematically in FIG. 5c, dielectric film 70' is grown to a thickness of slightly less than the width of recess 67. It will be appreciated by one of average skill in the art that the layer-by-layer deposition of dielectric film 70' is schematically illustrated in the figures by the dashed lines that separate dielectric film 70' into a layered structure. However, it will further be appreciated that, due to the conformal nature of ALD films, in practice dielectric film 70' forms a single seamless, conformal film, regardless of the number of discrete layers of dielectric material deposited to form dielectric film 70'.

Figure 5D:
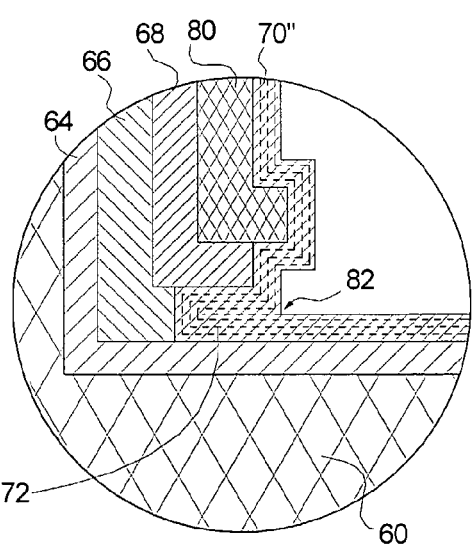
Figure 5E:
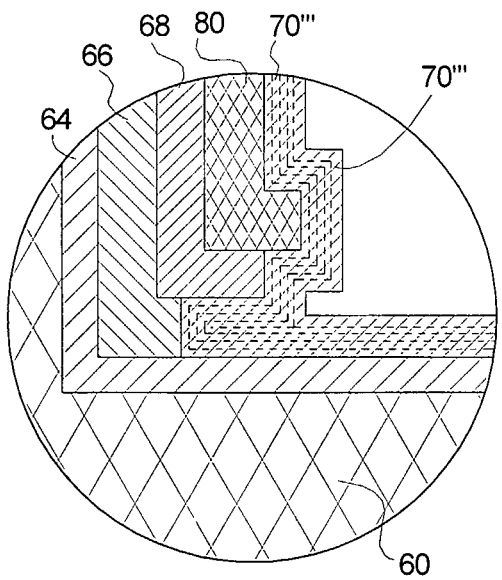

As shown in FIG. 5d, dielectric film 70" is eventually grown to a thickness that seamlessly closes recess 67. Accordingly, it will be appreciated that dielectric film 70" is grown to a thickness that is equal to approximately half the width of the recess, or approximately half the thickness of device layer 66 to form plug 72. A closure, therefore, forms between the portions of dielectric film 70" that covers each side of the recess. The position of the closure is represented by arrow 82. Subsequent layers of dielectric material may be further deposited on the surface of dielectric film 70". After recess 67 has been filled, each such successive layer will be conformally deposited to form an additional thickness over the entire area of the existing dielectric film 70''', as shown in FIG. 5e.

As localized defects are relatively small, relatively thin over-layer 224 (FIG. 3b) is necessary to "repair" the anodized layer 220. For example, a layer 224 in the thickness range of from 10 nm to 50 nm is suitable for most applications. Accordingly, the 500V capacitor in the example given above with a dielectric thickness of 1 μm is substantially produced with an anodized $Al_2O_3$ dielectric layer that is complemented by a thin over-layer of ALD $Al_2O_3$ film. A combination of 950 nm to 990 nm and 5 nm to 10 nm of anodized and ALD $Al_2O_3$ layers, respectively, are recommended. In contrast, in the above example for a 10V capacitor with only 20 nm of dielectric film, it is suitably useful to implement the entire dielectric film with ALD.

In some applications, the implementation of ALD films for the formation of the entire dielectric layer may be preferred even for high-voltage capacitors. These include the fabrication of capacitors over substrates made from material other than aluminum such as etched nickel foils, pressed powder substrates, or capacitors made with higher dielectric constant dielectric layers such as $Ta_2O_5$, $HfO_2$, $ZrO_2$, $TiO_2$ and combinations of these layers, and aluminum oxide or silicon dioxide in the form of alloys and/or nano-laminates as known to those who are skilled in the art of ALD. For example, a capacitor for very high temperature applications is formed over nickel foil using $Al_2O_3$ ALD film to implement the dielectric layer. In another example, a 1:3 layer of $Al_2O_3$: $Ta_2O_5$ ALD alloy is implemented over an etched aluminum foil substrate with advantageous combination of high dielectric constant of $\in_r \sim 16$ and high dielectric strength of ~7 MV/cm to enable ~×1.4 higher capacitance×voltage density. The alloys and nano-laminate techniques known in the art of ALD are also proven to produce extremely low-defect density films of otherwise inferior materials. For example, 1:1 alloying of $TiO_2$ with $Ta_2O_5$ is useful to produce high-quality amorphous dielectric layers with $\in_r \sim 32$ and breakdown voltage of >5 MV/cm giving a ×2 enhanced capacitance density over $Al_2O_3$ dielectric.

The advantages of low-cost anodic oxidation, defect elimination and increased capacitance density can be obtained by implementing a combination such as 50 nm of anodized $Al_2O_3$ and 100 nm of combination high-dielectric constant ALD film such as $TiO_2/Ta_2O_5$ with advantageous 50V rating and 1600 μF/gram capacitance density when implemented over aluminum foils with ~×75 area enhancement, as compared with only 760 μF/gram for an equivalent capacitor with 100 nm of $Al_2O_3$ dielectric.

In another preferred embodiment of the invention, defects in an anodized $Al_2O_3$ layer are repaired by an electrolytic aging process. Accordingly, the anodized foil, such as 202+204 in FIG. 2, is sandwiched between two electrolytic paper foils and metal plates serving as the cathode. Contact is made to foil 202 serving as the anode. The stack is immersed within an electrolytic solution to resemble a two-sided planar electrolytic capacitor and DC voltage is applied to perform the "aging" process as known in the art of electrolytic capacitor fabrication, only the "aging" is performed soon after the dielectric "forming" (the anodic oxidation) step rather than over the complete capacitor. Following the "defect repair", foil 202+204 is rinsed to remove the electrolyte.

In similarity to self-healing of metallized thin film capacitors, a rather thin electrode film is locally heated at defect points by the high-localized current to locally evaporate the metallic electrode and the weak spot and therefore isolate the weak spots from the capacitor. Accordingly, film 202 (FIG. 2) including layers 204 and 206 are clamped between two large plates that are grounded and serve as cathodes. When foil 202 is electrically connected to a DC power source, the thin layer 206 can be locally heated at a defect failure point due to high current and locally eliminate or oxidize layer 206 at the weak spot to provide "self-healing".

C. Low ESR Capacitors

Figure 6A:
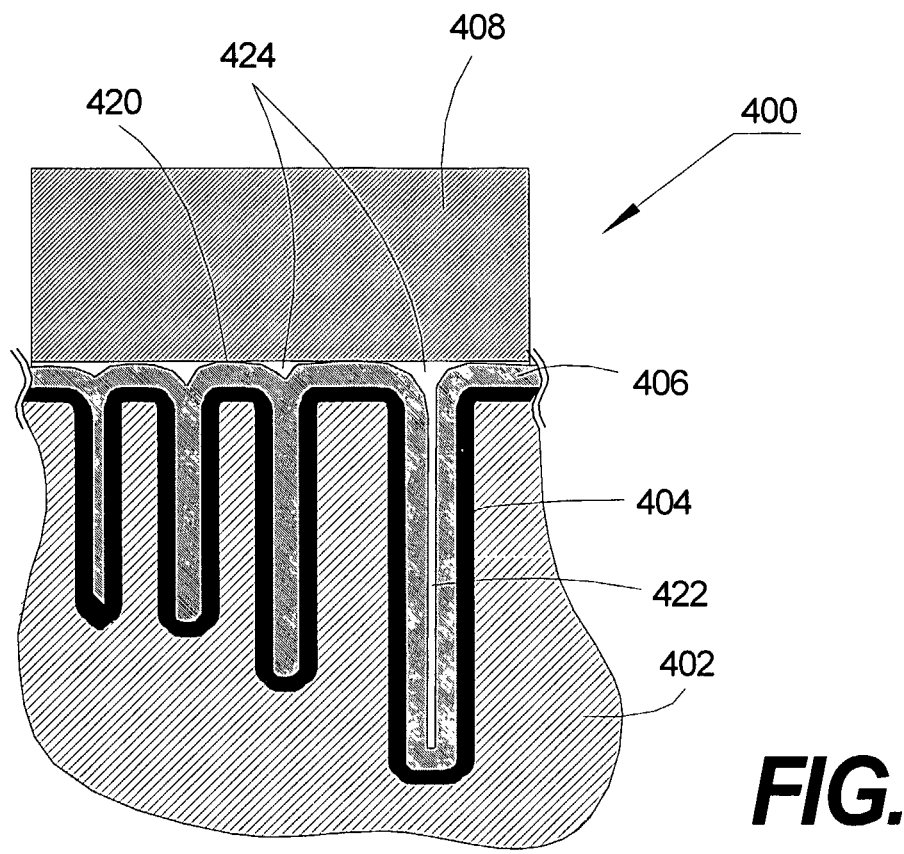
FIGS. 6a and 6b depict schematically the layout of high-energy storage density capacitors utilizing a thick cathode film or a thick deposited overlaying film to reduce ESR according to the invention.

A major object of this invention is to achieve low equivalent series resistance (ESR) capacitors. Layer 206 (FIG. 2) implementations with typically a thin layer of ALD TiN or other conductive ALD films are mostly suitable to obtain low-contact resistance into the area enhanced features. Typically, a 50 nm layer of TiN ALD film with only 60Ω/□ is sufficient to provide low contact resistance into the high area features with 0.5 μm-4 μm width and up to 20 μm depth. For example, ~1 μΩ of ESR is applied to a 10 cm$^2$ area capacitor of completed layer stack 202+204+206 having ~×40 area enhancement and ~20 μm deep etched features. Likewise, a 5/45 nm TiN/W stack layer 206 will contribute only 0.13 μΩ of ESR per the capacitor described above. Accordingly, the contribution of the contact layer to ESR is not substantial. Embodiments that reduce the contact resistance of the entire capacitor are illustrated schematically in FIGS. 6a and 6b. FIG. 6a illustrates conformal conductive film 406 that is formed over dielectric layer 404 within the capacitor layout 400. Film 406 makes contact 420 with foil 408 across the area of foil 408. To improve contact 420, the native oxides are preferably removed from foil 408 prior to winding with foil 402 (having the layer stack 404+406 on it). For example, aluminum foil 408 is etched in dilute phosphoric acid solution. Alternatively, in low-temperature capacitor applications, a layer of conductive epoxy or paste (not shown) is inserted between foil 408 and layer 406. Further reduced contact 420 resistance implements thin conductive non-oxidizing layer (not shown) over foil 406 such as evaporated gold, preferably, in the thickness range of from 20 nm to 50 nm. Improved contact 420 is also preferably achieved by coating the top surface of layer 406 with thin non-oxidizing film (not shown) such as gold without ambient exposure to substantially avoiding contact deterioration from the oxidation of the top surface of layer 406. Alternatively, materials such as ruthenium (Ru) deposited over foil 408 and/or film 406 reduce contact resistance by virtue of their conductive oxides, i.e., RuO$_2$ that may form on the surface of Ru without substantially increasing the ESR. Layers implemented to reduce contact 420 resistance do not need to conform to the high-capacitance area points, since the contact 420 is formed only at the top facing surfaces. Accordingly, conventional physical vapor deposition (PVD) techniques are suitable.

Figure 6B:
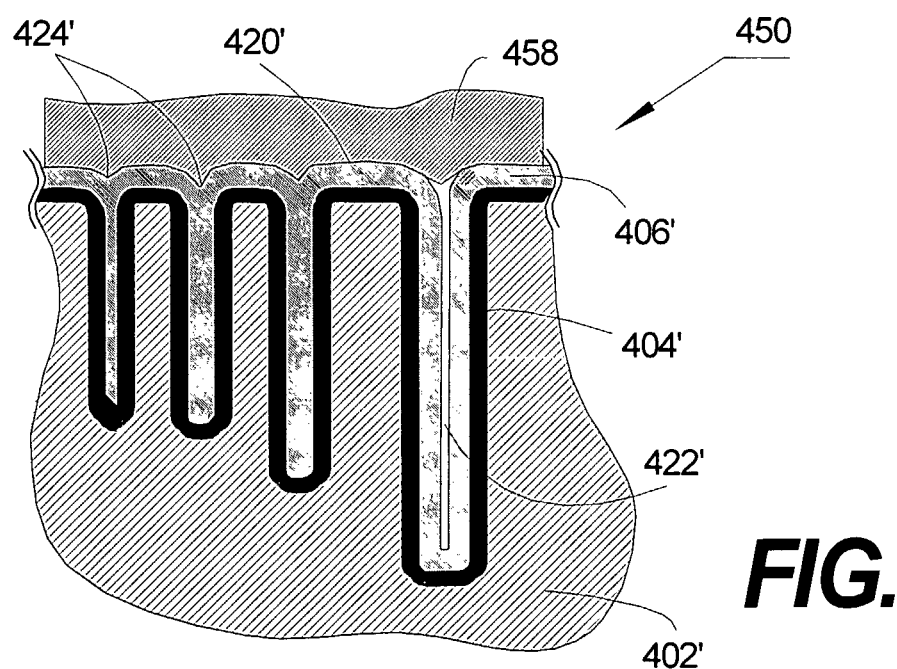

While the capacitor layout described in reference to FIG. 6a is suitable for low ESR applications, further improvements are obtained by the implementation of thick overlaying films in contact with layer 406. This embodiment further reduces series resistance related to the non-contact fraction of the area 424. The embodiment 450 is illustrated in FIG. 6b. Film 458 is preferably formed over contact layer 406' without ambient exposure to avoid surface oxidation of layer 406'. For example, layer 458 is formed by sputtering 0.5 μm to 1 μm of aluminum as known to those who are skilled in the art. While this technique achieves substantially higher contact area through fractional area 424', it is not required to substantially penetrate into the deep high-capacitance area features such as 422'. In some embodiments, film 458 completely replaces foil 408 (FIG. 6a). In most common applications, relatively thin film 458 is implemented with or without a complementary non-oxidizing film at the top to improve the contact with foil 408 (not shown). In another example, film 406' composes metals such as copper or ruthenium as seed layers for electroplated copper or nickel film 458. In this case, advanced electroplating techniques known to those who are skilled in the art of semiconductor and other device processing are implemented to substantially refill into features 422' and further reduce the ESR. In yet another embodiment, film 406' is implemented using ALD of, i.e., TiN or TiN/W while the seed layer for electroplating is implemented using sputtering or evaporation, preferably without ambient exposure. In that case, a seed copper, nickel, or Ru film does not need to conform to the entire structure of features 422'. The electroplated 458 film creates contact that extends into features 422' to the extent that the seed layer is able to penetrate into the high-aspect ratio features. Nevertheless, the PVD-seed/electroplating method described herein is useful to obtain low ESR that is suitable for extremely low ESR applications such as high-peak power energy-storage capacitors. An electroless plating process is also useful to create layer 458 over a conductive seed layer.

In an additional preferred embodiment of the invention, layer 458 is deposited as a continuation of contact layer 406' using the ALD process. Layer 458 can be made from substantially the same material as layer 406' or from a substantially different material. In another embodiment, layer 458 is deposited using suitable CVD processes and suitable conductive materials such as tungsten (W). Preferably, layer 458 is deposited following the deposition of layer 406' without ambient exposure. In yet another preferred embodiment, capacitors for relatively low temperature applications are fabricated with a layer of conductive epoxy or paste that replaces layer 458 (not shown). In this implementation, the conductive material at the appropriate viscosity is applied over layer 406' as known in the art. Application is achieved, for example, by spraying, painting, dipping, or rolling and is preferably applied in multiple applications using suitably lower viscosity to establish low resistivity contact over layer 406' followed preferably by higher viscosity applications to establish a thicker layer 458.

Following the fabrication process, the capacitor film stack including substrate foil 402 (FIG. 6b), dielectric layer 404, contact layer 406, and conductive layer 458 is slit into strips having suitable length and width that accommodate the desired capacitance. The foil is then wound into a substantially compact shape to fabricate compact and robust capacitors. Alternatively, the strip of capacitor film stack 252 (FIG. 7a) is wound with strip 208' to fabricate compact and robust capacitors with substantially lower ESR configuration. Film stack 252 may or may not include layer 458. Preferably, capacitor 200' is fabricated with strip 252 and strip 208' slightly offset as illustrated schematically in FIG. 7a and in the cross-section shown in more detail in FIG. 7b. This offset winding process creates gaps 254 and edges 256 on the lower 251 and upper 253 faces of the tubular capacitor, respectively. As illustrated schematically in the cross-section of FIG. 7b, the capacitor includes alternating foil 202', dielectric layer 204', contact layer 206', and foil 208'. Alternatively, the capacitor also includes layer 458 as per the description above in reference to FIG. 6b (not shown).

Following the winding, the lower face 251 is etched to substantially remove layer 206" (FIG. 8a) from the exposed area in gaps 254'. Preferably, layer 206" is over-etched to create recesses 260. Alternatively, if layer 458 was applied as detailed above in reference to FIG. 6b, layer 458 is also etched from gaps 254' and preferably recessed using over-etch techniques as known in the art of semiconductor and other device processing (not shown). Preferably, layer 206" and layer 458 are etched in solution using suitable selective etching techniques as known to those who are skilled in the art. For example, EDTA-$H_2O_2$—$NH_4OH$ is used to selectively etch TiN without impacting $Al_2O_3$ dielectric layer 204" or many other dielectric materials implemented within layer 204" over aluminum foil 202" as known in the art. In another example, tungsten in layer 458 can be selectively etched using hydrogen-peroxide solutions without significantly etching TiN, $Al_2O_3$, or aluminum as known in the art. The art of wet-etching provides many different and suitable selective etching methods that are adequate for the creation of process step 200" (FIG. 8a) showing only the cross-sectional view of the layers. In process step 200", only the lower face 251' of the capacitor is exposed to the etching media, while the upper face 253' is prevented from contact with the etching media. Preferably, the rolled capacitors are partially dipped into the etching media to maintain face 253' unexposed. Alternatively, face 253' can be protected within a fixture or by a removable film, and the entire capacitor may be exposed to the etching media.

Figure 8D:
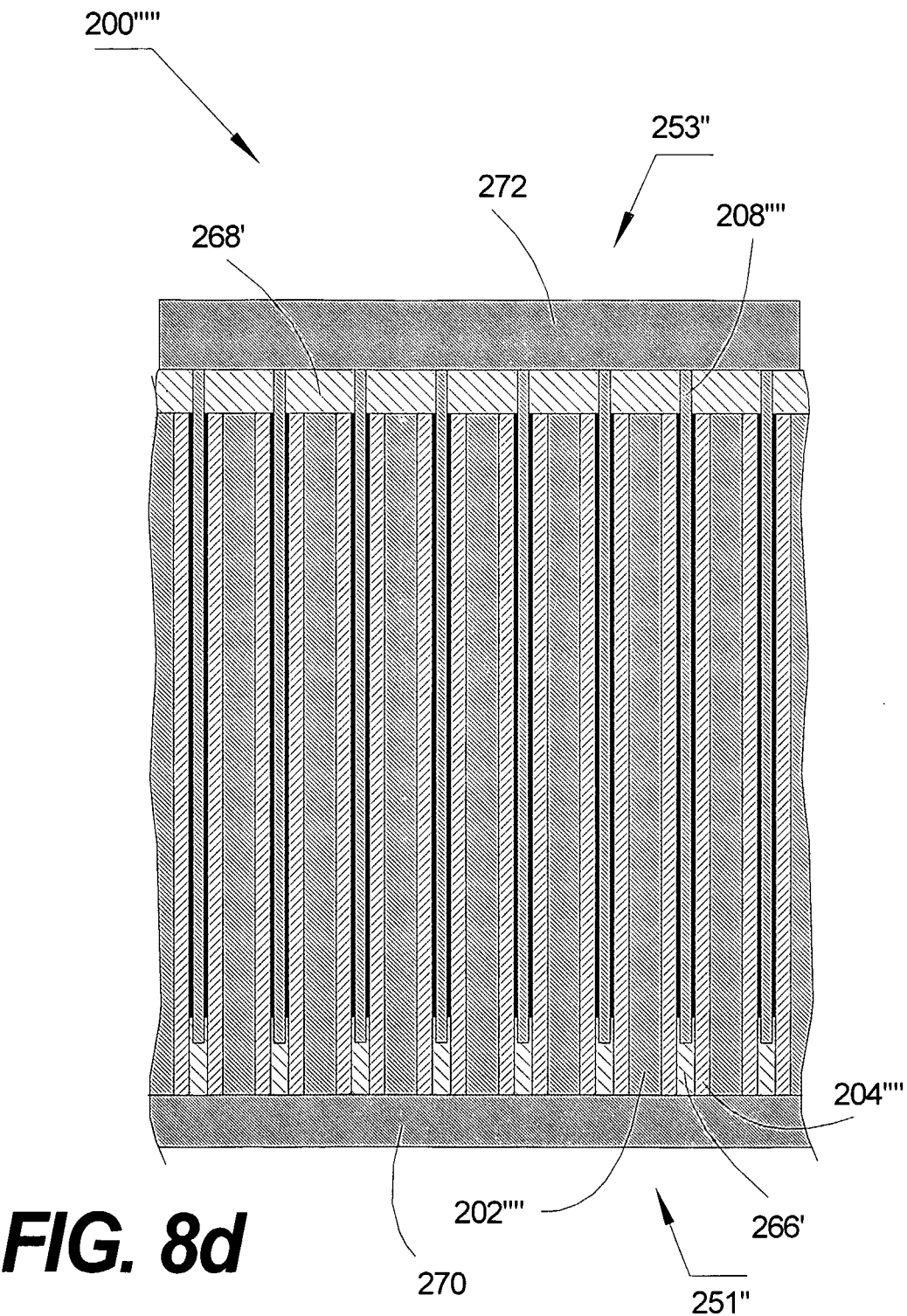

In process step 200'" illustrated in FIG. 8b, the capacitor is coated with a thick insulating layer. FIG. 8b illustrates the portions 262 and 264 of the insulating layers at the bottom 251' and the top 253' faces of the capacitor, respectively. However, the insulating layer preferably coats the entire capacitor. Preferably, layer 262-264 is applied in multiple applications using dipping or spraying methods with lower viscosity solution applied first to substantially penetrate into the gaps 254' and recesses 260, as well as coat over edges 256' of foil 208" followed by the application of higher viscosity solution to fabricate substantially thicker layers and further followed by appropriate bake-out and/or curing of the layer as known in the art. Layer 262-264 is selected to suit the performance specifications of the capacitor and specifically the appropriate temperature range. For example, various epoxy materials are suitable for low temperature ranging up to ~100° C., while polyimide films are suitable for capacitors with temperature specifications ranging up to ~350° C. (for example, Photoneece® PWDC-1000 from Dow Corning). Higher temperature ranges are accommodated by coating materials such as BCESQ or other equivalent spin-on glass materials wherein the temperature range is extended to ~500° C. Alternatively, layer 262-264 can be deposited using CVD or PE-CVD as known in the art to preferably fabricate capacitors with and extended temperature range exceeding 500° C. (care should be taken in that case to ensure that other construction materials are also suitable for the high temperature range. For example, replacing aluminum with nickel is required to extend the temperature range beyond 400° C.). While layer 262-264 preferably should substantially penetrate into gaps 254' and coat over edges 256', it is not required to be perfectly conformal and could include voids at recesses 260 and other hard-to-reach corners without impacting the reliability and the manufacturing yield of the capacitor. The insulating layer 262-264 is applied to insulate the edge of foil 202" and foil 208" from the contact layers that are formed at the top face 253' and the bottom face 251', respectively, during subsequent fabrication step 200"" described below in reference to FIG. 8d.

In subsequent process step 200"" illustrated in FIG. 8c, the capacitor faces 251" and 253" are polished and subsequently cleaned from debris as known in the art. Bottom face 251" is polished to remove a portion of insulating layer 262 and a portion of foil 202" leaving insulating plugs 266 between dielectric layer edges 204'" and exposing foil 202" edges 202'". The bottom of foil 208" and layer 206" are, therefore, encapsulated by the combination of dielectric layer 204'" and plugs 266. Also, top face 253" is polished to remove a portion of insulating layer 264 and a portion of foil 208" leaving insulating plugs 268 between foil 208" edges 208'" and exposing foil 208" edges 208'". The top of foil 202", therefore, is encapsulated by plugs 268. Similar polishing and debris removal techniques are successfully and cost-effectively applied for the fabrication of semiconductor interconnect layouts as known in the art of semiconductor manufacturing. Preferably, capacitor polishing and subsequent debris cleanup is applied to a large number of capacitors that are preferably clamped together to create a large, 300 mm diameter area that enables the utilization of readily available polishing equipment commonly used for semiconductor fabrication. This equipment is typically capable of "dry-in-dry-out" handling of substrates wherein the entire polishing and cleanup is automatically and reproducibly performed. Additionally, chemical-mechanical polishing (CMP) methods as known in the art are used to improve the yield of process step 200"" by substantially matching the erosion rate of the various materials being polished. Process step 200"" preferably implements polishing to achieve planarized faces 251" and 253" that are advantageous for making electrical contacts. However, those who are skilled in the art may implement other techniques, such as etchback, to fabricate the faces 251" and 253".

In subsequent process step 200""' (FIG. 8d), electrical contacts 270 and 272 are formed over bottom face 251" and top face 253", respectively. Contact layers 270 and 272 are substantially connected to the entire edge of foils 202"" and the entire edge of foil 208"", respectively, for substantially reduced ESR. Contact layers 270 and 272 can be formed using many different techniques that are known in the art. For example, conductive epoxy is used to make capacitors for low-temperature applications. A variety of brazing alloys and brazing techniques are suitable to fabricate contact layers 270 and 272 making capacitors that are suitable for high-temperature applications. Swaging techniques, as well as utilization of conductive epoxies, cements, and pastes, are also suitable to form low-resistance contacts with the exposed edges of foils 202"" and 208"". The preferred embodiment layout that is illustrated in FIG. 8d achieves very low ESR by substantially contacting to the entire edges of foil 202"" and foil 208"" at the bottom face 251'" and the top face 253'", respectively, while maintaining high fabrication yield and high reliability given the encapsulation of foil 208"" and foil 202"" at the bottom face 251'" and the top face 253'", respectively, using plugs 266' and dielectric layer 204"" and using plugs 268', respectively. This combination of parallel-like contacts and substantially encapsulating insulations is key for the performance, fabrication yield, and reliability of the capacitors fabricated according to the invention.

Figure 9:
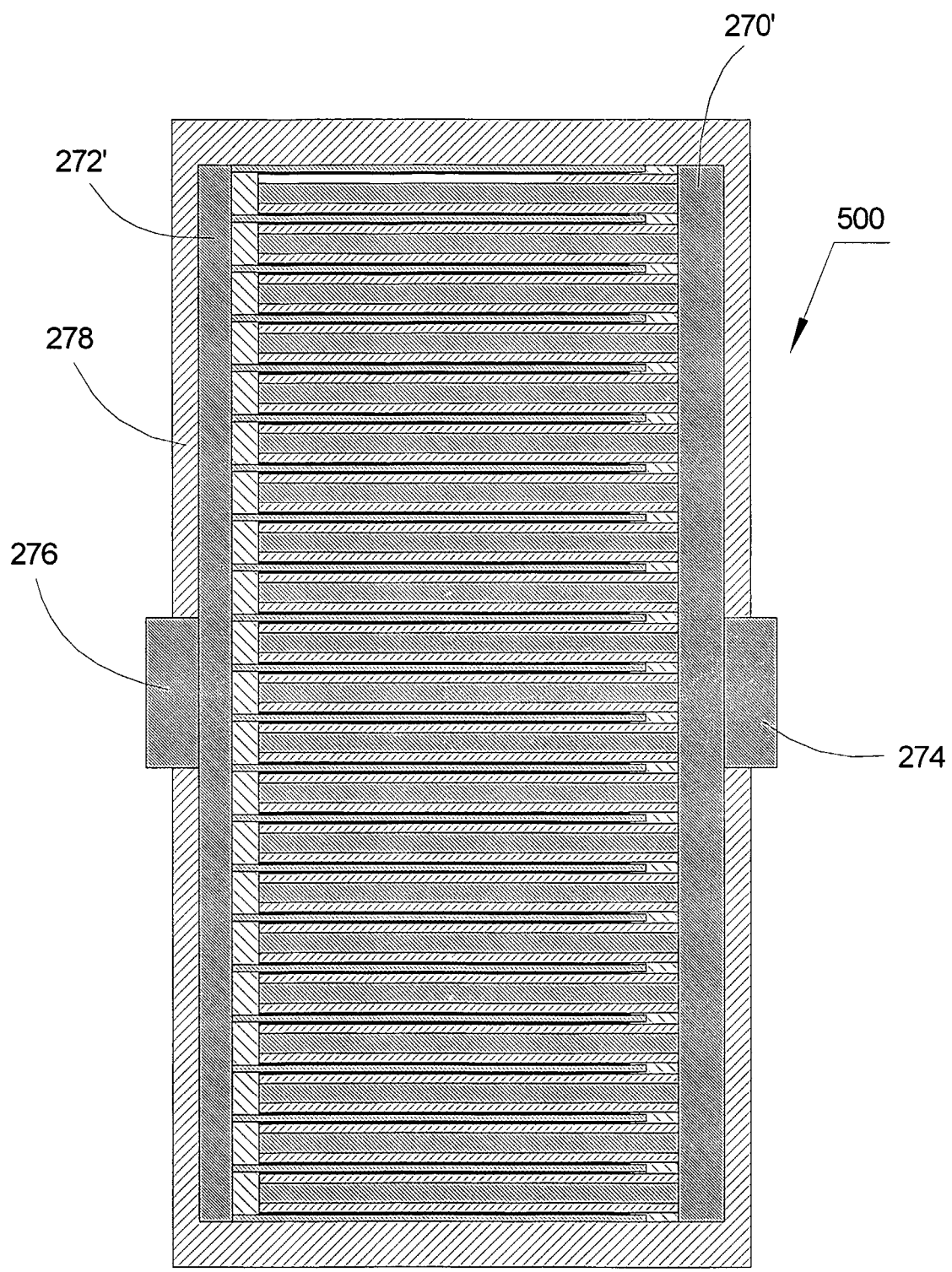
FIG. 9 depicts schematically a cross-sectional view of a completed capacitor according to the invention.

In further processing, the capacitors are completed by attaching contact pads and encapsulating the capacitors with protective jackets as commonly known in the art. For example, FIG. 9 illustrates a schematic cross-sectional view of a completed capacitor including contact pads 274 and 276 making contact with contact layers 270' and 272', respectively and further including jacket 278.

Figure 10C:
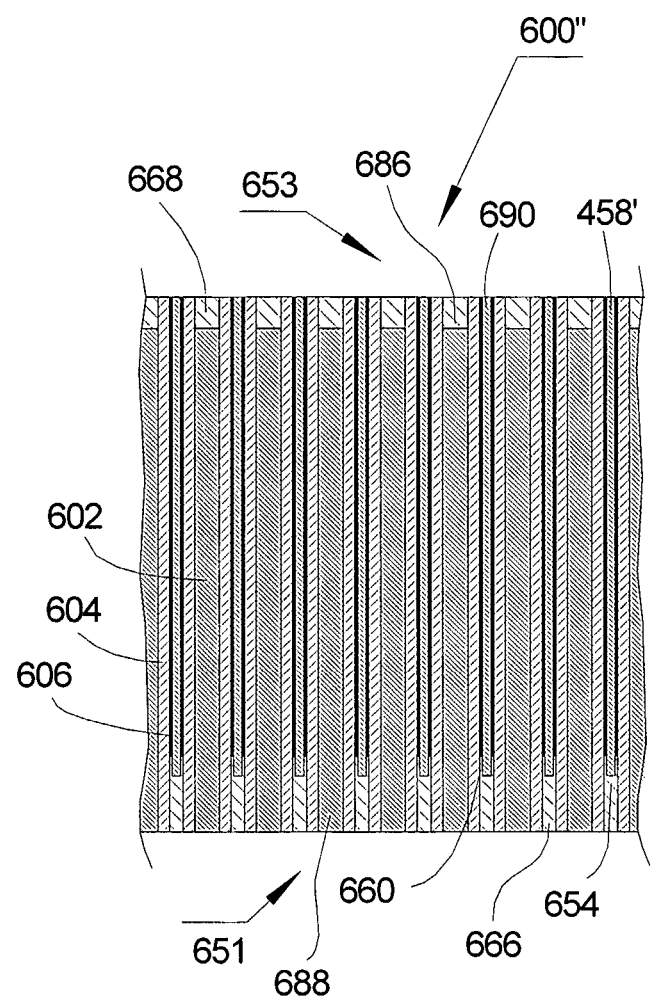

In an additional embodiment discussed above in reference to FIG. 6b, the capacitor layout does not include foil 208' (FIG. 7a), and the improved low ESR contact is derived by a thick contact layer 458 (FIG. 6b). Accordingly, the capacitors are formed by winding only one foil that includes (FIG. 10a cross-sectional view) substrate foil 602, dielectric layer 604, contact layer 606, and thick contact layer 458'. Preferably, layer 458' is made from a material that is different from foil 602 to facilitate useful etch selectivity. In the subsequent process step 600 illustrated in FIG. 10a, the layers 606 and 458' are selectively etched at the bottom face 651 to create gaps 654 and undercuts 660. Top face 653 then is subjected to a selective etch process 600' that is illustrated in FIG. 10b to selectively etch foil 602 and create gaps 686. In subsequent process steps, the capacitor is encapsulated and polished similarly to the process steps described in reference to FIGS. 8b and 8c above to generate layout 600" illustrated in FIG. 10c. Accordingly, the capacitor is prepared for low ESR contact formation by encapsulating layer 458' and foil 602 with plugs 666 and 668, respectively, at the capacitor bottom face 651 and the capacitor top face 653, respectively, and exposing the edges 688 and 690, respectively, of foil 602 and layer 458', respectively, at bottom face 651 and top face 653, respectively. In subsequent processing, contact layers and pads and capacitor completion is fabricated similarly to the process layout described above in reference to FIG. 8d and FIG. 9.

Figure 11:
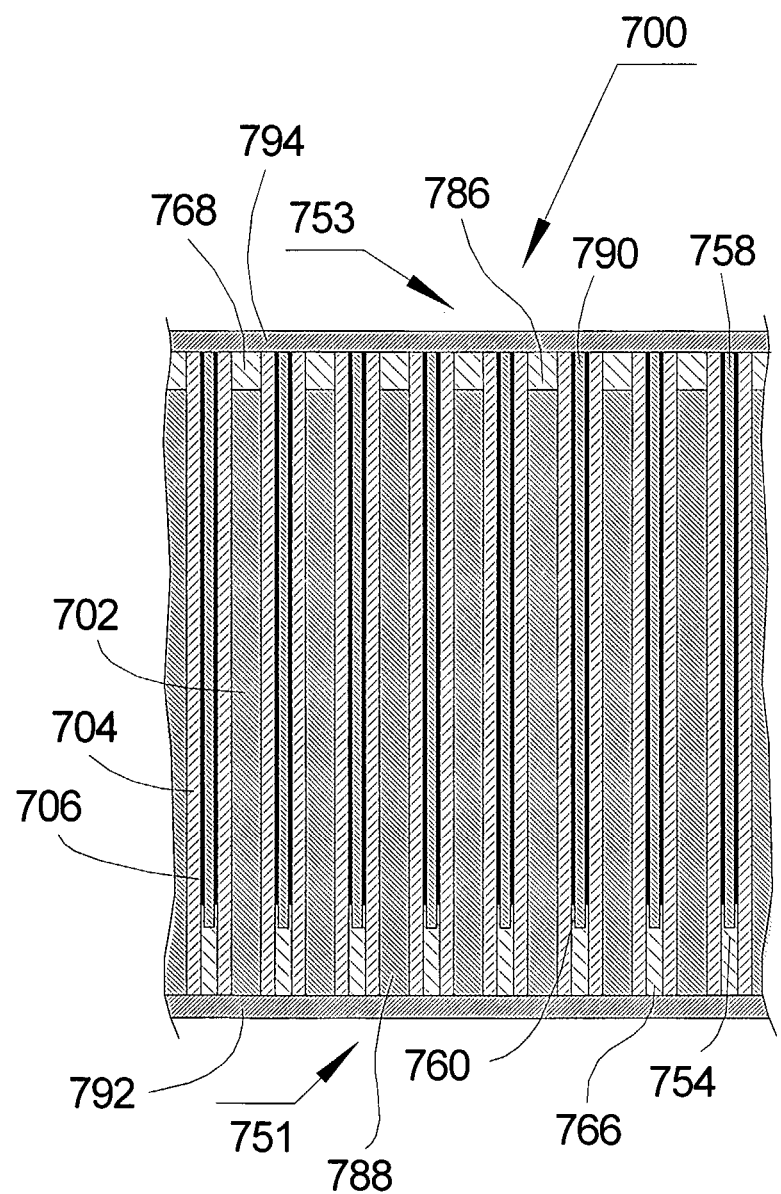
FIG. 11 depicts schematically a multilayer stacked capacitor layout according to the invention.

Alternative capacitor layouts and related fabrication processes utilize multilayer stacking techniques. Multilayer stacking techniques are particularly suitable to fabricate capacitors with relatively small capacitance. For example, FIG. 11 illustrates the cross-sectional view of a multilayer stack made of foil 702, dielectric layer 704, contact layer 706, and thick layer 758 stacked together multiple times. For example, five layers are stacked to create a capacitance area density of 354 µF/cm² suitable for 10V applications (with 50% derating) using a 50 µm thick foil 702 etched to obtain ×100 area enhancement, 20 nm thick $Al_2O_3$ dielectric layer 704 on both sides, 50 nm thick TiN contact layer 706 on both sides, and 100 nm tungsten layer 758 on both sides, having a total thickness of ~0.25 mm. Following the stacking process, the capacitors are cut into small area pieces such as 1.4×2 mm capacitors having 10 µF capacitance and 0.02-0.03Ω ESR. The exemplary capacitor with ~70 µFV/cm³ (after encapsulation) represents about a factor of 10 improvement over prior art best achieved with tantalum electrolytic capacitors. This improvement is particularly advantageous given the anticipated significantly better performance, lifetime, and temperature endurance of the inherently electrostatic capacitors. The multilayer stack is preferably prepared over a large-capacitance area foil and consequently cut into the small size capacitors. The cutting is followed by removal of debris from the edges using suitable cleaning techniques known in the art of semiconductor and other device processing such as megasonic enhanced etching. In subsequent processing steps that are substantially similar to the processing steps described above in reference to FIGS. 10a-10c, 8b, and 8d, the capacitor layout 700 that is illustrated schematically in FIG. 11 is formed. Accordingly, the capacitor is prepared for low ESR contact formation by encapsulating layers 758 and foils 702 with plugs 766 and 768, respectively, at the capacitor first face 751 and the capacitor second face 753, respectively, and exposing the edges 788 and 790, respectively, of foils 702 and layers 758, respectively, at first face 751 and second face 753, respectively and subsequently creating first contact layer 792 and second contact layer 794, respectively. In subsequent processing, contact pads and capacitor completion is fabricated similarly to the process layout described above in reference to FIG. 9.

Figure 12:
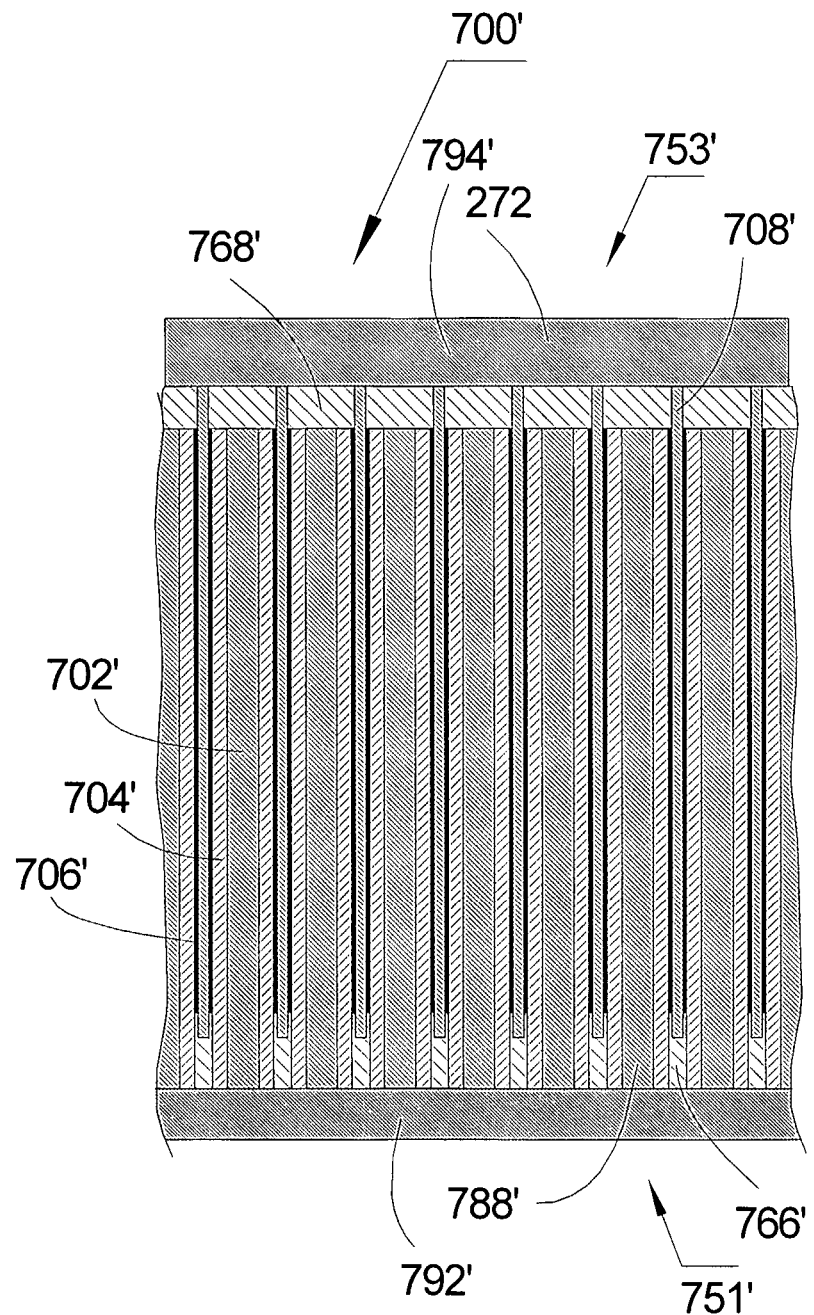
FIG. 12 depicts schematically a multilayer stacked capacitor layout according to the invention.

Alternatively, multilayer stacking techniques are also implemented with additional foils 708 to further reduce ESR as illustrated in FIG. 12. In the specific example 700' of FIG. 12, the capacitor does not include contact improving layers 758 between foils 708 and contact layers 706'. However, these layers and additional oxide suppression layers are suitable for this implementation in accordance with the description given above. Multilayer stacking techniques are particularly suitable to fabricate capacitors with relatively small capacitance. In the example of FIG. 12, a cross-sectional view of a multilayer stack made of foil 702', dielectric layer 704', contact layer 706', and foil 708 stacked together multiple times is depicted. For example, five layers are stacked to create a capacitance area density of 354 µF/cm² suitable for 10V applications (with 50% derating) using a 50 µm thick foil 702' etched to obtain ×100 area enhancement, 20 nm thick $Al_2O_3$ dielectric layer 704' on both sides, 50 nm thick TiN contact layer 706' on both sides, and 5.8 µm aluminum foil 708 on both sides, having a total thickness of ~0.31 mm. Following the stacking process, the capacitors are cut into small area pieces such as 1.4×2 mm capacitors having 10 µF capacitance (~55 µFV/cm³) and ~$10^{-4}$Ω ESR. The cutting is followed by removal of debris from the edges using suitable cleaning techniques known in the art of semiconductor and other device processing such as megasonic enhanced etching. In subsequent processing steps that are substantially similar to the processing steps described above in reference to FIGS. 8a-8d, the capacitor layout 700' that is illustrated schematically in FIG. 12 is formed. Accordingly, the capacitor is prepared for low ESR contact formation by encapsulating foils 708' and foils 702' with plugs 766' and 768', respectively, at the capacitor first face 751' and the capacitor second face 753', respectively, and exposing the edges 788' and 790', respectively, of foils 702' and foils 708', respectively, at first face 751' and second face 753', respectively, and subsequently creating first contact layer 792' and second contact layer 794', respectively. In subsequent processing, contact pads and capacitor completion is fabricated similarly to the process layout described above in reference to FIG. 9, and the final dimension of the capacitors are 1.6×2.2×0.5 mm×mm×mm.

Alternative multilayer stacking techniques are implemented by modifying the process described in reference to FIG. 8a, wherein layer 706' is not etched to be removed from gap area 766'. Rather, laser scribing is used to remove a narrow lane of layer 706', such that the edge of the layer contacts the first contact layer 792', but is electrically isolated from the rest of layer 706' that lies substantially beyond the de-metallized lane. Laser scribing use in stacked layers metallized thin film capacitor manufacturing is known in the art and described, for example, in U.S. Pat. No. 5,055,965 issued Oct. 8, 1991 to Charles C. Rayburn.

Figure 13:
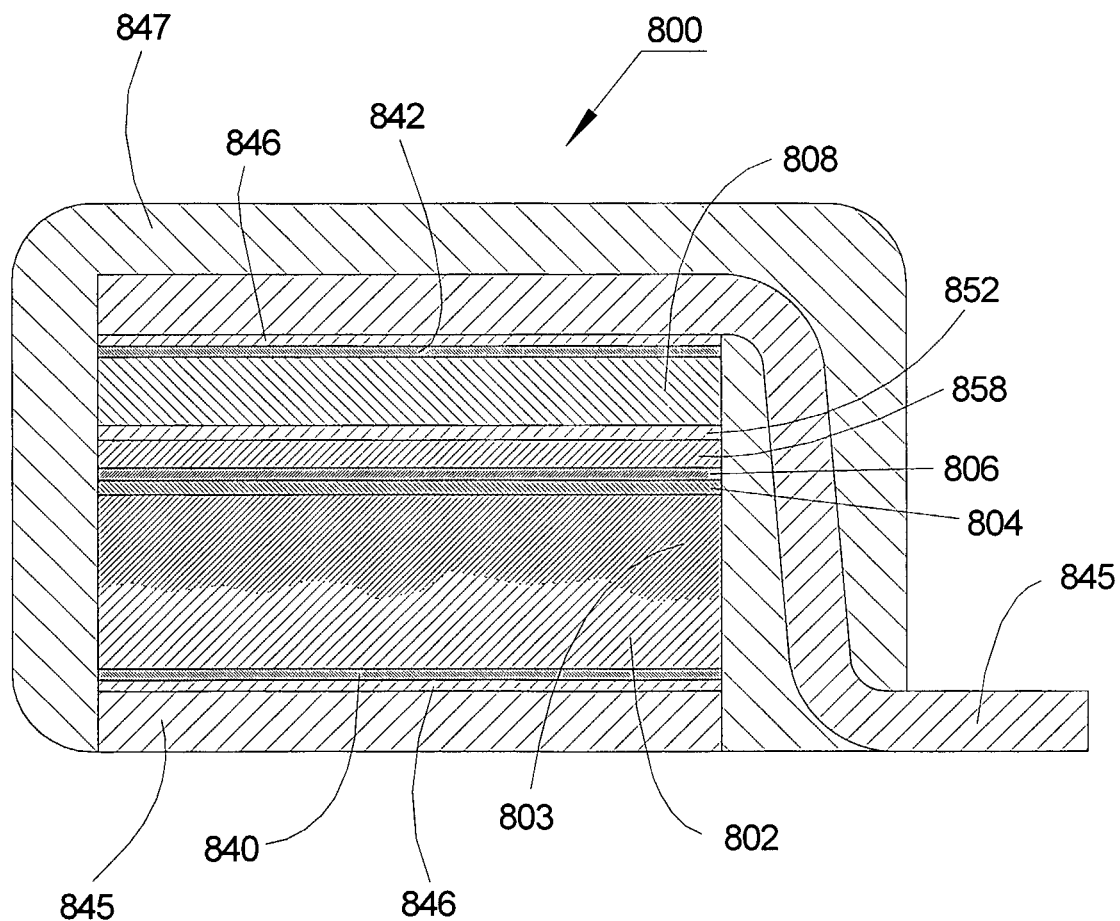
FIG. 13 depicts schematically the layout of a discrete capacitor manufactured from a single layer of stacked capacitor foil according to the invention.

Multiple other techniques are useful to fabricate low ESR capacitors with parallel connection configuration based on techniques known in the macroscopic capacitor art or other possible cost-effective techniques. For example, a modified fabrication process is implemented to utilize a single layer stack to fabricate smaller capacitors. For example, FIG. 13 illustrates an embodiment of a small macroscopic capacitor 800 comprising a 25 µm thick aluminum foil 802 etched on one side to obtain ×100 area enhancement, a 20 nm thick $Al_2O_3$ dielectric layer 804 formed over the etched side 803 of foil 802 either by oxidation, ALD, or oxidation followed by ALD, a 5 nm thick TiN contact layer 806 serving as an adhesion/barrier layer for copper metallization, a 0.5 µm thick copper layer 858 deposited by first depositing an ALD seed (10 nm) followed by electroplating, and a 2 µm thick copper foil 808 brazed to copper layer 858 using brazing alloy 852. In this figure, the finer cross-hatching at 803 represents the penetration of the etch into the surface. The large porosity on the etched surface 803 which, in combination with the conformal $Al_2O_3$ and the conformal ALD deposition of the TiN and copper, gives rise to the enhanced capacitance, is not shown as it is much out of scale for the drawing. Alternatively, the entire thickness of 2.5 µm of copper (858+808) is electroplated, eliminating the need for brazing alloy 852. Alternatively, layer 808 is deposited using sputtering techniques eliminating the need for brazing alloy 852. Thin layers of gold, 840 and 842, approximately 50 nm thick, are also evaporated over the bottom face of foil 802 and the top face of foil 808, respectively, to improve subsequent solder attachment of the completed capacitor. Accordingly, 10V compatible capacitors (50% derated) are formed with 35 µF/cm² capacitance and ~$10^{-4}$Ω/µF ESR. For example, using an area of 4×4 mm×mm, a capacitor with 5.6 µF and ESR of ~0.0005Ω is obtained. These capacitors are subsequently brazed or soldered onto ribbon leads 845 using, for example, brazing alloy 846 and further encapsulated with a protective jacket 847 as illustrated in FIG. 13 to fabricate discrete (shown) or arrays (not shown) of surface mount capacitors. Alternatively, foil stacks including layers (from bottom up) 840, 802, 804, 806, 858, 808, 842 are integrated into multilayer PC boards (PCB) as described below to advantageously achieve ~100 µFV/cm³ specific capacitance within a thickness of only ~30 µm.

D. Integration with PC Boards

The capacitor foils represented in the description of embodiments in reference with FIG. 13 above are particularly useful for integration into printed circuit boards (PCBs). For example, an embodiment of a portion 900 of a PCB is described in reference to FIG. 14. A capacitor is fabricated as described above over a 25 µm aluminum foil 902 etched on one side 903. Dielectric layer 904 is grown over the etched side 903, for example, to a thickness of 20 nm that enables 10V applications (at 50% derating) grown by ALD or a combination of anodic oxidation and ALD. A contact layer 906 is grown by ALD, for example, 10 nm of TiN. An additional layer 958 is grown over layer 906 to obtain low contact ESR, such as 0.5 µm of copper grown by a combination of seed ALD and electroplating. Both the bottom of foil 902 and top of layer 958 are coated with PVD gold 940 and 942, respectively, preferably to a thickness of 20 nm to 50 nm. This stacked foil 950 is utilized by PCB manufacturers to integrate capacitors into the layout of PCBs.

Figure 14:
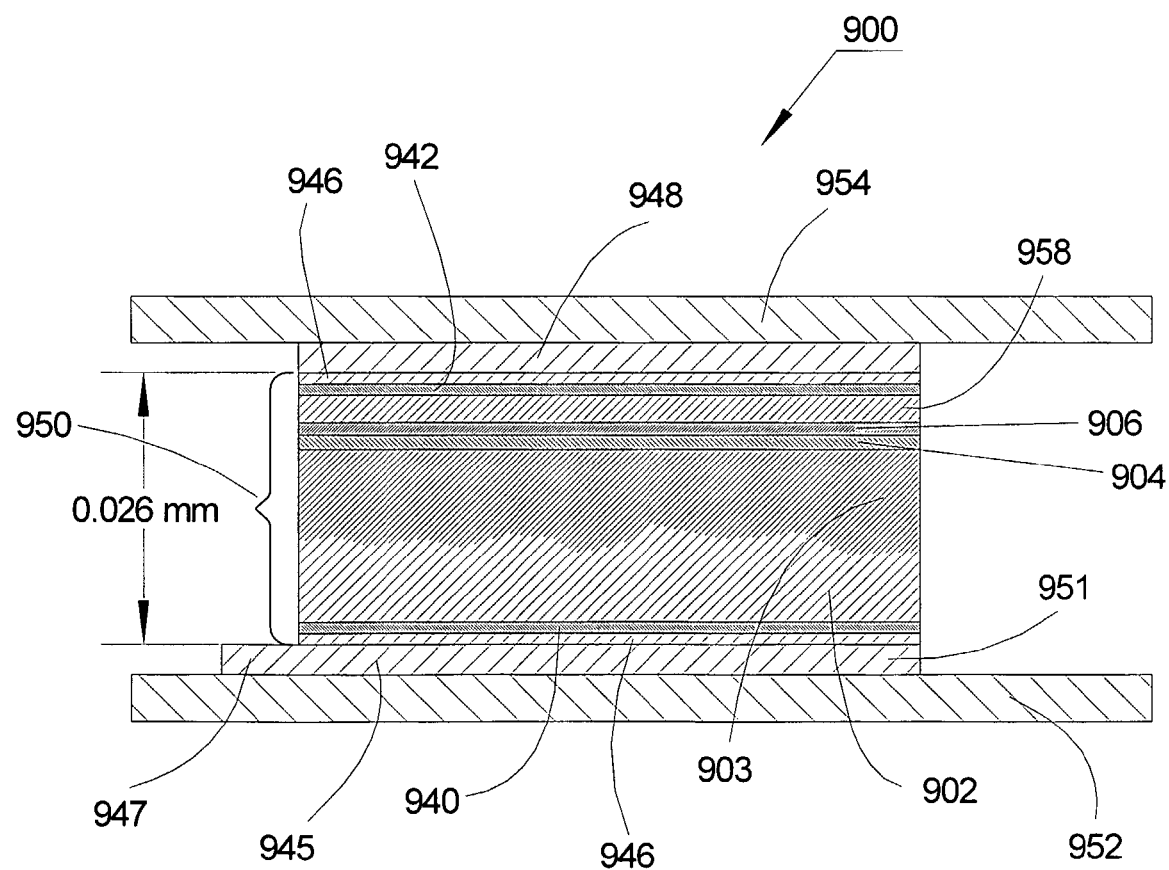
FIG. 14 depicts schematically the layout of a PCB integrated capacitor according to the invention.

For example, in the embodiment illustrated in FIG. 14, metallized Kapton films are implemented to construct multilayer PCBs as known to those who are skilled in the art. One of the Kapton foils 952 is fabricated with a layout of conductors as known in the art and schematically shown by 947 in FIG. 14 and with additional capacitor contact pads 951. Following this, foil 950 is laminated and soldered, brazed, or otherwise glued with conductive material over Kapton foil 952 with patterned conductors 947 and 951. At this point, foil 950 is patterned as known in the art and etched to create the desired capacitors over pads 951. The values of the capacitors are selected by selecting the area of the capacitors. Following patterning, subsequent debris removal is performed, as known in the art. The capacitors with a thickness of ~26 µm are then soldered, brazed, or glued with conductive cement to pads 948 that are prepared at the bottom of Kapton foil 954. FIG. 14 does not represent the thickness values of the various layers accurately. Given the significantly smaller thickness of the capacitors at ~26 µm compared to the final thickness of the PCB in the range of 500 µm, the gaps between the capacitors are left empty in one preferred embodiment. In another preferred embodiment of the invention (not shown), the gap is filled with, for example, polyimide of perfluoro-polymer materials. Following the lamination of Kapton foils 952 and 954 together with other foils that comprise the PCB, the capacitors are entirely embedded within the PCB representing a significant area saving and low contact ESR from pads 951 and 948 to capacitors electrode 902 and 906, respectively. The method for integrating foil 950 is compatible with PCB manufacturing techniques and is easily adapted into customized PCB by the pattern of pads 951 and 948 and the pattern delineated from foil 950. Typically (although not necessary), one of the contacts to the capacitors, for example 948, is a continuous ground plane that covers the majority of the area of the related Kapton foil, for example 954. Within the delineation of foil stack 950 into the specific pattern, a multiple etch step process is implemented to adequately etch the various different layers comprising the stack.

E. High-Energy Density Capacitor Storage Devices

Figure 15A:
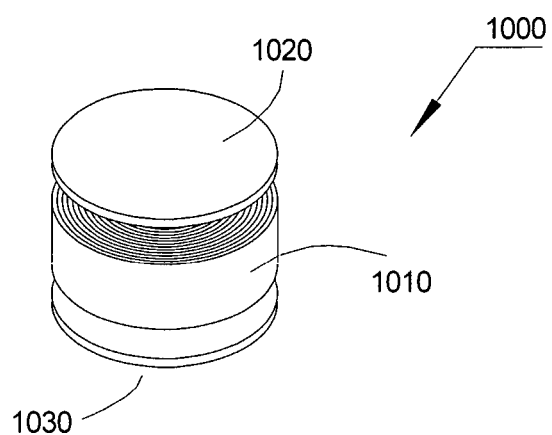
FIGS. 15a and 15b depict schematically a high-energy storage capacitor according to the invention.
Figure 15B:
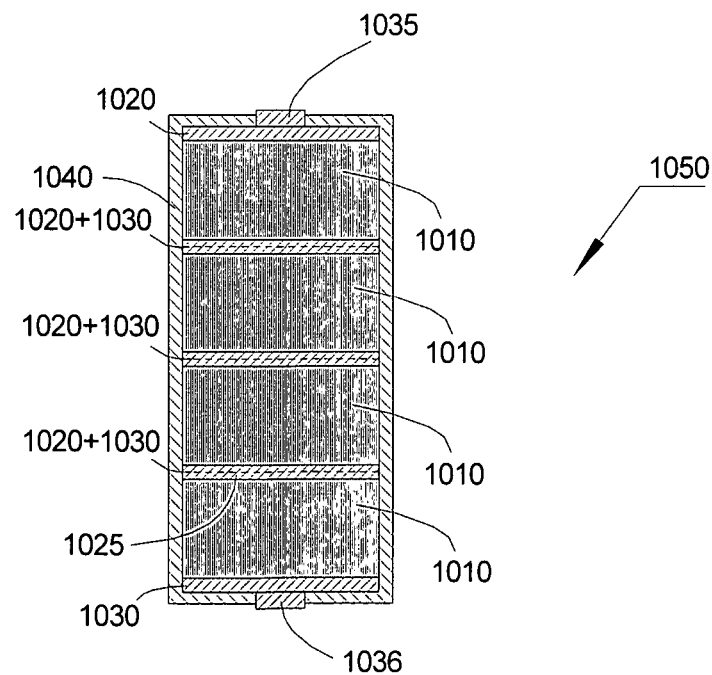

An objective of this invention is to fabricate high-energy storage capacitors. Advantageously, capacitors that are suitable for high voltage are fabricated over aluminum foils with lower area enhancement foil. For example, 50 µm foils with an etched ×40 area enhancement can accommodate a 1.0 µm thick $Al_2O_3$ dielectric layer grown on both sides of the foil by ALD or combination of anodic-oxidation and ALD as described above. Derated at 50%, these dielectric films are suitable for the fabrication of 500V capacitors. Low ESR contact is established, for example, by implementing a 50 nm TiN contact layer deposited by ALD followed by 0.5 µm of copper deposited by a combination of 10 nm seed ALD layer and electroplating and by utilizing a commercially available 5.8 µm thick aluminum foil 208 (FIG. 2). Accordingly, capacitance per area is 0.56 µF/cm². The thickness of the stack is ~56 µm and the weight per area is 0.01 gram/cm². A capacitor with 400 µF is formed by winding 1 cm wide strips. The total area of a strip is 714 cm²; therefore, the length of a strip is 714 cm. Wound over a stainless thin-wall steel capillary with 0.3125 cm (⅛ inch) outer diameter, the final capacitor has a tubular shape with 176 windings, 2.3 cm diameter of wound films and 3.4 µΩ ESR, and a weight of 6.7 grams including 2×0.5 mm thick copper contact discs 270' and 272' (FIG. 9) and further illustrated in embodiment 1000 depicted in FIG. 15a. In FIG. 15a, the wound capacitor foil 1010 is shown prior to assembly with contact plates 1020 and 1030. Four capacitors are used to fabricate embodiment 1050 illustrated in FIG. 15b. The capacitors are assembled in series by soldering or brazing plates 1020 and 1030 together and then contact pads 1035 and 1036 are added. Finally, protective jacket 1040 is fabricated. The stacked capacitor device having 100 µF capacitance can work at 2 KV voltage and has an ESR of 13.6 µΩ. A protective and electrically insulating jacket 1040 increases the diameter of the complete capacitor to 2.5 cm and the total length to 4.6 cm and adds ~8 grams to the weight. Accordingly, the complete capacitor weighs ~35 grams and has a volume of ~22.6 cm³. Energy storage capacity is shown as $E=CV^2/2=200$ jouls or energy density of 5.7 jouls/grams. The capacitor internal discharge time, τ=RC, is ~1.4 nsec, suitable for very high peak currents. For example, the capacitor holds a charge of ~0.2 joul when fully charged at 2 KV and is capable of discharging 50% of that charge within ~1 nsec, providing ~100,000,000 A of current over a short circuit. These properties, together with the long lifetime and high temperature endurance, represent significant improvements to the prior art.

The descriptions and examples of the preferred embodiment further explain the principles of the invention and are not meant to limit the scope of invention to any specific method or apparatus. All suitable modifications, implementations, and equivalents are included in the scope of the invention as defined by the summary of the invention and the following claims:

The invention claimed is:

1. A capacitor including a capacitor foil, said capacitor foil comprising:
    a chemically etched metallic foil;
    a conformal and substantially uniform dielectric layer formed over a first portion of said chemically etched metallic foil; and
    further comprising an electrolyte in electrical contact with said dielectric layer and an electrical bias system for applying an electrical potential between said chemically etched metallic foil and said electrolyte; and said electrical potential is selected to increase the breakdown voltage of said dielectric layer without substantially increasing the thickness of said dielectric layer;
    a substantially uniform and conformal first conductive film formed over said dielectric layer;
    wherein a second portion of said chemically etched metallic foil is not covered with said dielectric layer; and
    said conformal conductive film is electrically insulated from said portion of said chemically etched foil that is not covered with said dielectric layer.

2. The capacitor of claim 1, and further comprising an additional metal foil and wherein said additional metal foil is in electrical contact with said conformal first conductive film.

3. The capacitor of claim 2, said capacitor further comprising:
    a strip of said capacitor foil;
    said strip of said additional metal foil having substantially similar width and length to said capacitor foil; and
    wherein said strip of capacitor foil and said strip of additional metal foil are wound together to form a substantially compact capacitor core shape.

4. The capacitor of claim 1 wherein at least a portion of said conformal first conductive film is grown by atomic layer deposition (ALD).

5. The capacitor of claim 1, further comprising a second conductive layer in electrical contact with said conformal first conductive film wherein said second conductive layer is electrically insulated from said portion of said etched foil that is not covered with said formed dielectric layer.

6. The capacitor of claim 5, further comprising an additional metal foil in electrical contact with said second conductive layer.

7. The capacitor of claim 6, said capacitor further comprising:
    a strip of said capacitor foil;
    said strip of said additional metal foil having substantially similar width and length as said strip of capacitor foil; and
    wherein said strip of capacitor foil and said strip of additional metal foil are wound together to form a substantially compact capacitor core shape.

8. The capacitor of claim 5 and further comprising a strip of said capacitor foil wound to form a substantially compact capacitor core shape.

9. The capacitor of claim 5 wherein said capacitor foil is mounted onto a PCB;
    said PCB comprises electrical contact pads;
    said mounting comprises substantially making low ESR electrical contact with said electrical contact pads;
    said capacitor foil is delineated to define capacitors;
    said defined capacitors comprise of selected capacitance; and
    said selected capacitance is determined by the capacitance per area of said capacitor foil and the area of said defined capacitors.

10. The capacitor of claim 1 wherein at least a portion of said dielectric layer is formed by atomic layer deposition (ALD).

11. The capacitor of claim 1 wherein at least a portion of said dielectric layer is formed by anodic oxidation.

12. The capacitor of claim 1 wherein said capacitor foil is mounted onto a PCB; and
    said PCB comprises:
        electrical contact pads;
        said mounting comprises substantially making low ESR electrical contact with said electrical contact pads;
        said capacitor foil is delineated to define capacitors;
        said defined capacitors comprise of selected capacitance; and
        said selected capacitance is determined by the capacitance per area of said capacitor foil and the area of said defined capacitors.

13. The capacitor of claim 1 wherein said chemically etched metallic foil comprises aluminum.

14. The capacitor of claim 1 wherein said dielectric layer comprises aluminum oxide.

15. The capacitor of claim 1 wherein said conformal conductive film comprises titanium nitride.

16. The capacitor of claim 1 wherein said high area comprises more than 10 times area enhancement.

17. The capacitor of claim 1 wherein said capacitor foil further comprises:
    both sides of said metallic foil are chemically etched;
    said dielectric layer is formed on both sides of said chemically etched metallic foil; and
    said conformal conductive film is formed on said dielectric layer on both sides of said capacitor foil.

18. A capacitor including a capacitor foil, said capacitor foil comprising:
    a chemically etched metallic foil;
    a conformal and substantially uniform dielectric layer formed over a first portion of said chemically etched metallic foil; and
    a substantially uniform and conformal first conductive film formed over said dielectric layer;
    wherein a second portion of said chemically etched metallic foil is not covered with said dielectric layer; and
    said conformal conductive film is electrically insulated from said portion of said chemically etched foil that is not covered with said dielectric layer;
    wherein at least a portion of said dielectric layer is formed by atomic layer deposition (ALD);
    a portion of said dielectric layer is anodically oxidized; and
    the thickness of said ALD portion is selected to substantially increase the breakdown voltage of said dielectric layer.

* * * * *